US012503671B2

(12) United States Patent
Back et al.

(10) Patent No.: US 12,503,671 B2
(45) Date of Patent: Dec. 23, 2025

(54) FABRIC CONDITIONER COMPOSITION

(71) Applicant: Conopco, Inc., Englewood Cliffs, NJ (US)

(72) Inventors: Olivier Back, Lyons (FR); Christopher Boardman, Llandyrnog (GB); John Francis Hubbard, Knutsford (GB); Bala Naga Satyanarayana Thota, Vadodara (IN)

(73) Assignee: Conopco, Inc., Englewood Cliffs, NJ (US)

(*) Notice: Subject to any disclaimer, the term of this patent is extended or adjusted under 35 U.S.C. 154(b) by 307 days.

(21) Appl. No.: 18/284,332

(22) PCT Filed: Mar. 3, 2022

(86) PCT No.: PCT/EP2022/055406
§ 371 (c)(1),
(2) Date: Sep. 27, 2023

(87) PCT Pub. No.: WO2022/207230
PCT Pub. Date: Oct. 6, 2022

(65) Prior Publication Data

US 2024/0084227 A1 Mar. 14, 2024

(30) Foreign Application Priority Data

Mar. 29, 2021 (EP) .................................... 21305393

(51) Int. Cl.
*C11D 3/43* (2006.01)
*C11D 1/62* (2006.01)
*C11D 3/00* (2006.01)
*C11D 3/20* (2006.01)
*C11D 3/50* (2006.01)

(52) U.S. Cl.
CPC .................. *C11D 3/43* (2013.01); *C11D 1/62* (2013.01); *C11D 3/0015* (2013.01); *C11D 3/2003* (2013.01); *C11D 3/505* (2013.01); *C11D 2111/12* (2024.01)

(58) Field of Classification Search
CPC ........... C11D 3/43; C11D 1/62; C11D 3/0015; C11D 3/2003; C11D 3/505; C11D 2111/12; C11D 3/50
USPC .......................................................... 510/515
See application file for complete search history.

(56) References Cited

U.S. PATENT DOCUMENTS 5,773,409 A * 6/1998 Haq ....................... C11D 1/835 510/521
5,851,982 A * 12/1998 Sakata .................. C07C 229/12 554/114
5,858,960 A * 1/1999 Conroy ................ C11D 3/0015 510/521
6,323,172 B1 * 11/2001 Trinh .................. C11D 3/2093 510/516
2001/0004635 A1 * 6/2001 Wahl ........................ C11D 1/62 510/518
2003/0139313 A1 * 7/2003 Turner ..................... C11D 3/48 510/332
2003/0216280 A1 * 11/2003 Martens ................. C11D 3/373 510/375
2004/0023830 A1 * 2/2004 Frankenbach ......... C11D 1/645 510/327
2004/0058848 A1 * 3/2004 Grainger ................ C11D 1/645 510/515
2004/0097395 A1 * 5/2004 Crutzen ............... C11D 3/0015 510/515
2004/0097396 A1 * 5/2004 Peeters .................. C11D 1/645 510/515
2005/0233939 A1 * 10/2005 Heibel ................. C11D 3/3769 510/515
2005/0256027 A1 * 11/2005 Heibel ................. C11D 3/3773 510/515

FOREIGN PATENT DOCUMENTS

EP 0309052 B1 11/1992
EP 2984161 B1 12/2018
JP H08301822 A 11/1996
WO 2018033607 A1 2/2018
WO 2020254337 A1 12/2020

OTHER PUBLICATIONS

STIC Search Report dated Sep. 14, 2025.*
International Search Report and Written Opinion dated May 30, 2022 for International Application No. PCT/EP2022/055406 (22 pages).
International Preliminary Report on Patetability dated Oct. 3, 2023 for International Application No. PCT/EP2022/055406 ((6 pages).

* cited by examiner

*Primary Examiner* — Eisa B Elhilo
(74) *Attorney, Agent, or Firm* — Carter, DeLuca & Farrell, LLP; George Likourezos; Bret P. Shapiro

(57) ABSTRACT

A fabric conditioner composition comprising: a) Fabric softening active according to formula (I), wherein each R, is independently selected from $C_5$-$C_{27}$ aliphatic groups, Y is a divalent $C_1$-$C_6$ aliphatic group, R', R" and R"', are independently selected from hydrogen or a $C_1$ to $C_4$ alkyl group, and X is an anionic group; b) 0.1 to 30 wt. % perfume; and c) Water.

13 Claims, No Drawings

FABRIC CONDITIONER COMPOSITION

FIELD OF THE INVENTION

The present invention is concerned with improved fabric softening actives for fabric conditioners.

BACKGROUND OF THE INVENTION

Fabric softeners otherwise known as fabric conditioners have been on the market for many years. The fabric softening agents have developed over the years. Commonly used softening agents are quaternary ammonium cationic surfactants, in particular ester linked quaternary ammonium compounds.

However, there is a need to further improve softening ingredients. For example, WO 2020/254337 discloses new quaternary ammonium compounds with surfactant properties and improved biodegradability. However, there is a need to improve stability compared to the surfactant disclosed therein. In particular, formulation stability. Improved formulation stability leads to the ability to suspend perfume microcapsules in the formulation or improves the shelf life of the composition.

The compositions described herein demonstrate improved formulation stability.

SUMMARY OF THE INVENTION

In a first aspect of the present invention is provided a fabric conditioner composition comprising:

a. Fabric softening active according to formula (I):

(I)

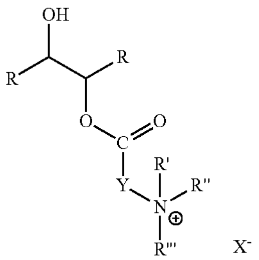

wherein each R, is independently selected from $C_5$-$C_{27}$ aliphatic groups,

Y is a divalent $C_1$-$C_6$ aliphatic group,

R', R" and R"', are independently selected from hydrogen or a $C_1$ to $C_4$ alkyl group, and X is an anionic group b. 0.1 to 30 wt. % perfume; and c. Water.

DESCRIPTION

These and other aspects, features and advantages will become apparent to those of ordinary skill in the art from a reading of the following detailed description and the appended claims. For the avoidance of doubt, any feature of one aspect of the present invention may be utilised in any other aspect of the invention. The word "comprising" is intended to mean "including" but not necessarily "consisting of" or "composed of." In other words, the listed steps or options need not be exhaustive. It is noted that the examples given in the description below are intended to clarify the invention and are not intended to limit the invention to those examples per se. Similarly, all percentages are weight/weight percentages unless otherwise indicated. Except in the operating and comparative examples, or where otherwise explicitly indicated, all numbers in this description indicating amounts of material or conditions of reaction, physical properties of materials and/or use are to be understood as modified by the word "about". Numerical ranges expressed in the format "from x to y" are understood to include x and y. When for a specific feature multiple preferred ranges are described in the format "from x to y", it is understood that all ranges combining the different endpoints are also contemplated.

Fabric Softening Active

The compositions of the present invention comprise a fabric softening active having the formula (I)

(I)

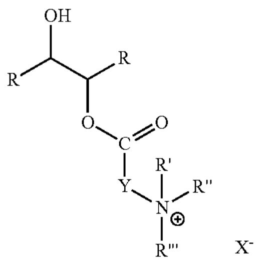

Wherein each R is independently selected from $C_5$-$C_{27}$ aliphatic groups, preferably a $C_6$ to $C_{24}$ aliphatic groups, Y is a divalent $C_1$-$C_6$ aliphatic group, and R', R" and R"' are independently selected from hydrogen or a $C_1$ to $C_4$ alkyl groups.

R may be saturated (i.e. free of any double or triple bonds). R may comprise at least one —C═C— double bond and/or at least one —C≡C— triple bond.

R may independently be linear or branched.

The aliphatic groups R, are preferably independently selected from alkyl groups, alkenyl groups, alkanedienyl groups, alkanetrienyl groups and alkynyl groups. Preferably, R is independently selected from alkyl and alkenyl groups. Most preferably R is independently selected from alkyl groups.

The aliphatic groups R, are preferably aliphatic groups selected from $C_6$-$C_{24}$ groups, preferably $C_6$-$C_{21}$ groups, more preferably $C_6$-$C_{21}$ groups, more preferably $C_6$-$C_{19}$ groups, even more preferably $C_6$-$C_{17}$ groups.

Preferably, R is independently selected from $C_6$-$C_{24}$ alkyl or alkenyl groups, more preferably from $C_6$-$C_{21}$ alkyl or alkenyl groups, more preferably $C_6$-$C_{19}$ alkyl or alkenyl groups, more preferably form $C_6$-$C_{17}$ alkyl or alkenyl groups. More preferably, R is independently selected from $C_6$-$C_{24}$ alkyl groups, more preferably from $C_6$-$C_{21}$ alkyl groups, more preferably $C_6$-$C_{19}$ alkyl groups, more preferably form $C_6$-$C_{17}$ alkyl groups.

Aliphatic groups, in particular alkyl groups, with 10 to 20, preferably with 10 to 17 carbon atoms have been found advantageous for stability.

Acyclic (not cyclic) aliphatic groups, more preferably linear aliphatic groups, still more preferably linear alkyl groups are particularly preferred examples of R. Excellent results in stability were obtained when R was a linear alkyl group having from 14 to 17 carbon atoms.

The number of carbon atoms of R can be even or odd. The R groups may have the same or different number of carbon atoms. In some embodiments, both R groups have an even number of carbon atoms or both R groups have an odd number of carbon atoms. Preferably one R has an odd number of carbon atoms and one R has an even number of carbon atoms. In a particular embodiment one R has an odd number of carbon atoms and the other R has an even number of carbon atoms, the even number being 1 less than the odd number.

R' is preferably a $C_1$ to $C_4$ alkyl group, preferably methyl or ethyl, more preferably methyl. Likewise, R" is preferably a $C_1$ to $C_4$ alkyl group, preferably methyl or ethyl, more preferably methyl. Likewise, R'" is preferably a $C_1$ to $C_4$ alkyl group, preferably methyl or ethyl, more preferably methyl. Preferably at least one, more preferably at least two, more preferably all three of R', R" and R'" are a $C_1$ to $C_4$ alkyl group, preferably methyl or ethyl, most preferably methyl.

Y is preferably an acyclic divalent $C_1$-$C_6$ aliphatic group, more preferably a linear divalent $C_1$-$C_6$ aliphatic group, still more preferably a linear alkanediyl (commonly referred to as "alkylene") $C_1$-$C_6$ group. Y has preferably from 1 to 4 carbon atoms. Exemplary Y are ethanediyl and methanediyl (commonly referred to as "methylene"). Excellent stability results were obtained when Y was a methylene group.

In some embodiments, the fabric softening active (I) is chosen from ionic compounds wherein Y is methylene, R', R" and R'" are methyl, and the two R groups are such that:

one R is n-tetradecyl while the other R is n-pentadecyl, or one R is n-hexadecyl while the other R is n-heptadecyl, or one R is n-pentadecyl while the other R is n-hexadecyl, or one R is n-tetradecyl while the other R is n-heptadecyl.

X is an anion. Suitable anions or anionic groups are e.g. halides such as chloride, fluoride, bromide or iodide, methyl sulfate, methosulfate anion ($CH^3OSO^{3-}$), methanesulfonate anion ($CH_3SO_3^-$), sulfate anion, hydrogensulfate anion ($HSO_4^-$) or an organic carboxylate anion such as acetate, propionate, benzoate, tartrate, citrate, lactate, maleate or succinate. X is preferably chloride or methosulphate.

The fabric softening actives for use in the present invention can be obtained by a variety of processes. Preferred processes for the manufacture include the reaction of an internal ketone of formula R—C(═O)—R, which internal ketone may preferably be obtained by decarboxylative ketonization of a fatty acid, a fatty acid derivative or a mixture thereof. A suitable process for the manufacture of internal ketones following this route is disclosed in US 2018/0093936 to which reference is made for further details. Two processes for the synthesis of the fabric softening actives of the present invention using internal ketones are described herein.

The first process starts with a Piria ketonization followed by hydrogenation, dehydration, epoxidation (to obtain an epoxide) and epoxide ring opening reaction (to obtain a monohydroxyl-monoester). The epoxide ring opening reaction step is followed by an amine condensation step (as the final step) to convert the monoester into a compound complying with formula (I). This is a multi-step process plugged on Piria technology. It has the advantage of being salt-free and relying on chemical transformations which can be easily performed.

First Process for Synthesis of Compounds of Formula (I)

Piria Ketonization

The basic reaction in the first step is:

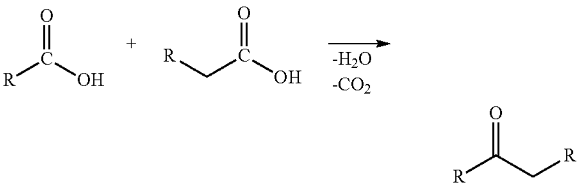

This reaction has been thoroughly described in U.S. Pat. No. 10,035,746, WO 2018/087179 and WO 2018/033607 to which reference is made for further details.

Hydrogenation

The internal ketone is then subjected to hydrogenation which can be carried out under standard conditions known to the skilled person aware of hydrogenation reactions:

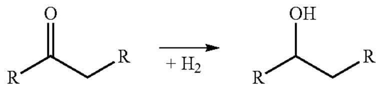

The hydrogenation reaction is conducted by contacting the internal ketone with hydrogen in an autoclave reactor at a temperature ranging from 15° C. to 300° C. and at a hydrogen pressure ranging from 1 bar to 100 bars. The reaction can be conducted in the presence of an optional solvent but the use of such solvent is not mandatory and the reaction can also be conducted without any added solvent. Examples of suitable solvents include: methanol, ethanol, isopropanol, butanol, THF, methylTHF, hydrocarbons, water or mixtures thereof. A suitable catalyst based on a transition metal should be employed for this reaction. Examples of suitable catalysts include heterogeneous transition metal based catalysts such as for example supported dispersed transition metal based catalysts or homogeneous organometallic complexes of transition metals. Examples of suitable transition metals are: Ni, Cu, Co, Fe, Pd, Rh, Ru, Pt, Ir. Examples of suitable catalysts include Pd/C, Ru/C, Pd/Al2O3, Pt/C, Pt/Al2O3, Raney Nickel, Raney Cobalt etc. At the end of the reaction, the desired alcohol can be recovered after appropriate workup. The skilled person is aware of suitable techniques. Details of this process step can e.g. be found in U.S. Pat. No. 10,035,746 to which reference is made here. The skilled person will select suitable reaction conditions based on their professional experience and taking into account the specific target compound to be synthesized.

Dehydration

In the next step, the alcohol thus obtained is subjected to dehydration to obtain an internal olefin. This reaction can also be carried out under standard conditions known to the skilled person. Example dehydration reactions are disclosed in U.S. Pat. No. 10,035,746, example 4.

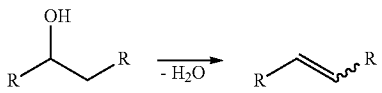

The dehydration reaction is conducted by heating the secondary alcohol in a reaction zone in the presence of a suitable catalyst at a temperature ranging between 100° C. and 400° C. The reaction can be conducted in the presence of an optional solvent but the use of such solvent is not mandatory; the reaction can also be conducted without any added solvent. Examples of suitable solvents include: hydrocarbons, toluene, xylene or their mixture. A catalyst must be employed for this reaction. Suitable examples of catalysts are acidic (Lewis or Bronsted) catalysts either heterogeneous solid acid catalysts or homogeneous catalysts. Examples of suitable heterogeneous catalysts include alumina (Al2O3), silica (SiO2), aluminosilicates (Al2O3-SiO2) such as zeolites, phosphoric acid supported on silica or alumina, acidic resins such as Amberlite® etc. Homogeneous catalysts can also be employed. Suitable acids include: H2SO4, HCl, trifluoromethanesulfonic acid, para-toluenesulfonic acid, AlCl3, FeCl3 etc. The water that is generated during the reaction can be distilled out from the reaction medium in the course of the reaction. At the end of the reaction, the desired olefin can be recovered after appropriate work-up. The skilled person is aware of suitable techniques for example those described in U.S. Pat. No. 10,035,746.

As above indicated, in the ionic monoammonium compounds of formula (I), embodiments wherein one R has an odd number of carbon atoms and one R has an even number of carbon atoms are generally preferred. This can occur when both R groups originate from a carboxylic acid having an even number of carbon atoms and is generally advantageous from an economic standpoint because fatty carboxylic acids of natural origin—which have typically such an even number of carbon atoms—are broadly available. This can also happen when both R groups originate from a carboxylic acid having an odd number of carbon atoms. In particular, embodiments wherein one R group has an odd number of carbon atoms and the other R group has an even number of carbon atoms, wherein the even number equals the odd number −1. This can occur when the internal olefin is obtained from a carboxylic acid having an even number of carbon atoms. For illustration purposes, internal olefins of which the R groups have 14 and 15 carbon atoms, 16 and 17 carbon atoms, 14 and 17 carbon atoms and 15 and 16 carbon atoms can be obtained starting from the following carboxylic acids or mixtures of carboxylic acids: palmitic acid alone, stearic acid alone, oleic acid alone, palmitic acid in admixture either with stearic acid or with oleic acid or with stearic acid and oleic acid, and stearic acid in admixture with oleic acid.

On the other hand, when one R originates from a carboxylic acid having an even number of carbon atoms and one R originates from a carboxylic acid having an odd number of carbon atoms, internal olefins and, at the end, ionic monoammonium compounds of formula (I) wherein either both R have an even number of carbon atoms or both R have an odd number of carbon atoms are obtained.

Epoxidation

This internal olefin can thereafter be oxidized to the respective epoxide wherein the double bond is substituted by an epoxide group in accordance with the following scheme (where the reactants are just exemplary for respective groups of compounds serving the respective function):

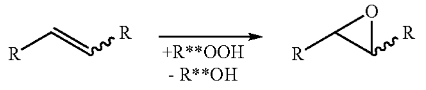

wherein R can be hydrogen or a hydrocarbon group that can be substituted and/or interrupted by a heteroatom or heteroatom containing group, or R can be an acyl group of formula R* —C(═O)— wherein R* can have the same meaning as R**.

The epoxidation reaction is advantageously conducted by contacting the internal olefin with an appropriate oxidizing agent in a reaction zone at a temperature ranging usually from 15° C. to 250° C.

Suitable oxidizing agents include peroxide compounds such as hydrogen peroxide ($H_2O_2$) that can be employed in the form of an aqueous solution, organic peroxides such as peracids of formula R** —$CO_3H$ (for example meta-chloroperoxybenzoic acid, peracetic acid, etc.), hydrocarbyl (e.g. alkyl) hydroperoxides of formula R'—$O_2H$ (for example cyclohexyl hydroperoxide, cumene hydroperoxide, tert-butyl hydroperoxide) where R in the peracid or R**' in the hydrocarbyl (e.g. alkyl) hydroperoxide is a hydrocarbon group (e.g. an alkyl group) that can be substituted and/or interrupted by a heteroatom or heteroatoms containing group.

The reaction can be conducted in the presence of an optional solvent but the use of such solvent is not mandatory. Examples of suitable solvents include: $CHCl_3$, $CH_2Cl_2$, tert-butanol or their mixtures.

When $H_2O_2$ is used as the oxidizing agent, the presence of an organic carboxylic acid during the reaction can be beneficial as it will generate insitu a more reactive peracid compound by reaction with $H_2O_2$. Examples of suitable carboxylic acids include: formic acid, acetic acid, propionic acid, butanoic acid, benzoic acid etc.

A catalyst can also be used to promote the reaction. Suitable catalysts are Lewis or Bronsted acids and for example: perchloric acid ($HClO_4$), trifluoromethanesulfonic acid, heterogeneous titanium silicalite ($TiO_2$—$SiO_2$), heterogeneous acidic resins such as Amberlite® resins, homogeneous organometallic complexes of manganese, titanium, vanadium, rhenium, tungsten, polyoxometellates etc.

At the end of the reaction, the desired epoxide can be recovered after appropriate work-up. The skilled person is aware of suitable techniques.

The epoxide can be directly engaged in the next step without further purification.

Epoxide Ring Opening Reaction

The epoxide ring opening reaction can thereafter be achieved by reacting the epoxide with a carboxylic acid reagent to obtain a monohydroxylmonoester compound of formula (II)

(II)

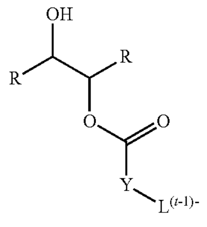

in accordance with the following scheme:

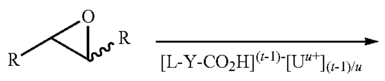

-continued

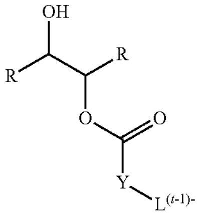

wherein,

L is a leaving group, t is an integer which is equal to 1 or which is equal or superior to 2, $U^{u+}$ is a cation, u is an integer fixing the positive charge of the cation, and R and Y are as previously described.

The epoxide ring opening reaction is performed by contacting the epoxide with a carboxylic acid reagent of formula (III):

$$[L—Y—CO_2H]^{(t-1)-}[U^{u+}]_{(t-1)/u} \quad \text{(III)}$$

wherein L, Y, t, $U^{u+}$ and u are as previously described.

It has surprisingly been found that the epoxide can be directly converted into the monohydroxyl-monoester when using such a carboxylic acid reagent.

When t is equal to 1, no cation is present. Otherwise said, the epoxide ring opening reaction is performed by contacting the epoxide with a carboxylic acid of formula:

$$L—Y—CO_2H$$

In the case the leaving group L already carries a negative charge in the carboxylic acid reagent (this is the case when (t−1) is greater than or equal to 1, i.e. when t is greater than or equal to 2), a cation noted $U^{u+}$ (with u preferably being 1, 2 or 3, more preferably 1) must be present in the reactant to ensure the electroneutrality. This cation may be selected from H+, alkaline metal cations (e.g. Na+ or K+), alkaline earth metal cations (e.g. Ca2+), Al3+ and ammonium, to mention only a few examples.

The nature of the leaving group L is not particularly limited provided next reaction step (i.e. amine condensation, as will be detailed later on) can occur. The leaving group L is advantageously a nucleofuge group. It is preferably chosen from:

a halogen, a (hydrocarbyloxysulfonyl)oxy group of formula $R^a—O—SO_2—O—$ wherein $R^a$ denotes a $C_1$-$C_{20}$ hydrocarbyl group which can be optionally halogenated, a (hydrocarbylsulfonyl)oxy group of formula $R^a—SO_2—O—$ wherein $R^a$ denotes a $C_1$-$C_{20}$ hydrocarbyl group which can be optionally halogenated (such as in $CF_3—SO_2—O—$), and an oxysulfonyloxy group of formula $—O—SO_2—O—$ (which is a leaving group L already carrying one negative charge on a terminal oxygen atom).

The hydrocarbyl group $R^a$, wherever present in here before formulae, may preferably be an aliphatic group or an aromatic group such as phenyl or ptolyl. The aliphatic group $R^a$ is usually a $C_1$-$C_6$ alkyl group, which can be linear or ramified; it is often a linear $C_1$-$C_4$ alkyl, such as methyl, ethyl or n-propyl.

The leaving group L is preferably chosen from:

a halogen, such as fluorine, chlorine, bromine or iodine, a (hydrocarbyloxysulfonyl)oxy group of formula $R^a—O—SO_2—O—$ wherein $R^a$ denotes a $C_1$-$C_{20}$ hydrocarbyl group, such as $CH_3—O—SO_2—O—$, and an oxysulfonyloxy group of formula $—O—SO_2—O—$.

An example of a compound with t equal to 1 is $CH_3—O—SO_3—CH_2—COOH$ which can be designated as 2-((methoxysulfonyl)oxy)acetic acid. Further examples of compounds in which t is equal to 1 and thus no cation is present, include: chloroacetic acid, bromoacetic acid and 2-chloropropionic acid.

An example for t being equal to 2 is sodium carboxymethylsulfate acid in which $[L—Y—COOH]^{(t-1)-}[U^{u+}]_{(t-1)/u}$ is $[O—SO_2—O—CH_2—COOH]^-[Na^+]$.

The reaction can be conducted in the presence of a solvent. However, the presence of such solvent is not mandatory and the reaction can be also conducted without any added solvent.

Examples of suitable solvents include: toluene, xylene, hydrocarbons, DMSO, Me-THF, THF or mixtures thereof.

The reaction is preferably conducted under an inert atmosphere, such as a nitrogen or rare gas atmosphere. An argon atmosphere is an example of a suitable inert atmosphere.

The reaction can be conducted in the absence of any catalyst. A catalyst can also be employed during the reaction and suitable catalysts are Bronsted or Lewis acid catalysts. Preferred examples of catalysts include: $H_2SO_4$, para-toluenesulfonic acid, trifluoromethanesulfonic acid, HCl, or heterogeneous acidic resins such as Amberlite® resins, AlCl3, FeCl3, SnCl4, etc.

The total number of moles of the carboxylic acid reagent of formula (III) which is contacted with the epoxide during the whole course of the reaction is advantageously no less than half of the total number of moles of epoxide; it is preferably at least as high as the total number of moles of epoxide, and it is more preferably at least twice higher than the total number of moles of epoxide. Besides, the total number of moles of carboxylic acid reagent which is contacted with the epoxide during the whole course of the reaction is preferably at most ten times higher than the total number of moles of epoxide.

The reaction takes preferably place in a reactor where the epoxide is in molten state. It has also been found advantageous that the reaction takes place in a reactor where the carboxylic acid reagent of formula (IV) is in molten state. Preferably, the reaction takes place in a reactor where both the epoxide and the carboxylic acid reagent are in molten state.

Preferably, the epoxide is added progressively in a reactor containing the whole amount of the carboxylic acid reagent of formula (I); preferably, it is added continuously in a reactor containing the whole amount of the carboxylic acid reagent, such as for example under a fed-batch process. It has been observed that contacting progressively, preferably continuously, the epoxide with the whole amount of the carboxylic acid made it possible to limit the self condensation of the epoxide.

The epoxide ring opening reaction can be conducted at a temperature ranging generally from about 20° C. to about 200° C. in the presence of an optional solvent. To allow for a sufficient reaction rate, the reaction is preferably conducted at a temperature of at least 25° C., more preferably at least 45° C., still more preferably at least 55° C. On the other hand, it has surprisingly been found that conducting the reaction at a high temperature resulted in the formation of a high amount of ketone, diester and dehydration by-products.

Accordingly, the reaction is conducted at a temperature which is preferably below 120° C., more preferably below 100° C. and still more preferably of at most 85° C.

The temperature may be kept constant over the whole reaction. However, to achieve the best compromise between reaction rate (conversion) and selectivity in the monohydroxyl-monoester, the reaction temperature is preferably slightly increased over the course of the reaction, while remaining always within the ranges delimited by the above specified lower and upper limits, e.g. 45° C. to 120° C., preferably 55° C. to 85° C.

Accordingly, the reaction of present concern, whereby an epoxide ring of an epoxide is opened to obtain a monohydroxyl-monoester, is desirably conducted in accordance with a process which comprises:

- a first step $S_1$ wherein the epoxide is reacted with a carboxylic acid reagent of formula (III) at a temperature $T_1$ from 20° C. to 70° C. for a time t1 which is sufficient to convert more than $f_1$=50 mol. % of the epoxide into the monohydroxyl-monoester;
- a second step $S_2$ wherein unconverted epoxide and unconverted carboxylic acid reagent at step $S_1$ are reacted at a temperature $T_2$ above 70° C. but below 120° C. for a time $t_2$ which is sufficient to convert more than $f_2$=80 mol. % of the epoxide into the monohydroxyl-monoester.

Preferably, the whole amount of the epoxide is added progressively, or even better continuously, during part or all of step $S_1$, over a period of time $t'_1$ representing at least 25%, preferably at least 40% of the total time $t_1$ of step $S_1$, in a reactor containing the whole amount of the carboxylic acid reagent of formula (III).

$T_1$ is preferably of at least 35° C., more preferably at least 45° C., still more preferably at least 55° C. Good results were obtained when $T_1$ was about 65° C.

$f_1$ is preferably 70 mol. %.

$t_1$ ranges generally from 10 min to 10 h. $t_1$ is preferably of at least 30 min, more preferably of at least 1 h. Besides, $t_1$ is preferably of at most 4 h, more preferably of at most 2 h.

$T_2$ is preferably of at least 75° C. Besides, $T_2$ is preferably of at most 95° C., more preferably of most 85° C. Good results were obtained when $T_2$ was about 80° C.

$f_2$ is preferably 90 mol. %, more preferably 95 mol. %, still more preferably 98 mol. %.

$t_2$ ranges generally from 10 min to 10 h. $t_2$ is preferably of at least 30 min, more preferably of at least 1 h. $t_2$ is preferably of at most 4 h, more preferably of at most 2 h.

The whole reaction can be conducted at atmospheric pressure or at subatmospheric pressure. It is preferably conducted at atmospheric pressure or under a light vacuum, that is to say at a pressure from 90 kPa to the atmospheric pressure (about 1 atm=101.325 kPa). More preferably, it is conducted at atmospheric pressure.

Although the above operating conditions aim to a large extent at maximizing the amount of monohydroxyl-monoester and minimizing the amount of diester co-product of formula (IV)

(IV)

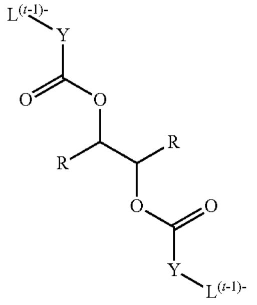

a certain amount of such a diester is however generally co-produced. The diester over (monohydroxyl-monoester+diester) molar ratio is generally below 50%, often of at most 30%, possibly of at most 15% or even at most 5% or 2%.

Other operating conditions may be applied which further restrain the manufacture of the diester compound, and allow a higher selectivity in the monohydroxyl-monoester compound. For example:

(c1) having the total number of moles of carboxylic acid reagent of formula (III) which is contacted with the epoxide during the whole course of the reaction equal of at most 1.10 times the total number of moles of epoxide, possibly from 0.10 to 1.00 time the total number of moles of epoxide or from 0.50 to 0.90 time the total number of moles of epoxide, (c2) conducting the whole epoxide ring opening reaction of the epoxide with the carboxylic acid reagent of formula (III) at a temperature T of at most 20° C. to 70° C., preferably at most 65° C., possibly at most 60° C. or at most 50° C., (c3) as the diester of formula (IV) is formed through the consecutive esterification reaction of the monohydroxyl-monoester compound of formula (II) with the carboxylic acid reagent, the reaction progress can be interrupted, for example by cooling the reaction medium at a temperature at which the esterification reaction converting (II) to (IV) does not evolve anymore (for example, at a temperature below 30° C.) or by removing the carboxylic acid reagent of formula (IV) (for example, through distillation under vacuum) or by neutralizing the carboxylic acid reagent by the addition of an at least equivalent amount of a base (for example, an aqueous NaOH solution), and (c4) applying (c1) and (c2), or (c1) and (c3), or (c2) and (c3), or (c1), (c2) and (c3).

However, applying at least one of (c1), (c2) and (c3) has generally adverse effects on the productivity, reaction rate and/or yield in the monohydroxylmonoester.

Further, as will be seen later on, the co-produced diester may result in obtaining a diammonium compound which exhibits outstanding biodegradability and surfactant properties, as the fabric softening active of formula (I) does, so that, in accordance with some embodiments of the present invention, it has been found advantageous to allow for the production of a certain amount of diester together with the monohydroxyl-monoester. To favour the removal of water and the obtaining of diester, yet in an amount that is lower than the amount of monohydroxyl-monoester include, step $S_2$ of the above detailed process can be partly or entirely conducted under vacuum, usually at a pressure $P_2$ below 50 kPa, preferably of at most 30 kPa, more preferably at most 10 kPa, still more preferably at most 3 kPa, e.g. about 1 kPa.

For example, step $S_2$ can be conducted in two parts, wherein temperature $T_2$ is firstly maintained at a pressure $P_{21}$ from 90 kPa to the atmospheric pressure (about 1 atm=101.325 kPa), preferably at atmospheric pressure, then pressure $P_2$ is decreased and maintained at a pressure $P_{22}$ below 50 kPa, preferably of at most 30 kPa, more preferably at most 10 kPa, still more preferably at most 3 kPa. The decrease of the pressure $P_2$ can be advantageously conducted with an increase in the temperature $T_2$ during step $S_2$: the second step $S_2$ can be conducted partly or entirely at a temperature $T_2$ of at least 85° C. but below 120° C.; for example, step $S_2$ can be conducted in two parts, wherein temperature $T_2$ is firstly maintained at a temperature $T_{21}$ from 70° C. but below 85° C., then temperature $T_2$ can be increased and maintained at a temperature $T_{22}$ of at least 85° C. but below 120° C. The first and second parts of step $S_2$ relative to the increase of temperature $T_2$ match preferably with, i.e. take preferably place during the same periods of time than, respectively the first and second parts of step $S_2$ as defined for the decrease of pressure $P_2$.

At the end of the reaction, the desired monohydroxyl-monoester compound of formula (II), optionally in combination with the diester compound of formula (IV), can be recovered after appropriate work-up and the skilled person is aware of suitable techniques.

Amine Condensation

The monohydroxyl-monoester compound of formula (II) can be converted into the fabric softening active of formula (I) through the following reaction scheme:

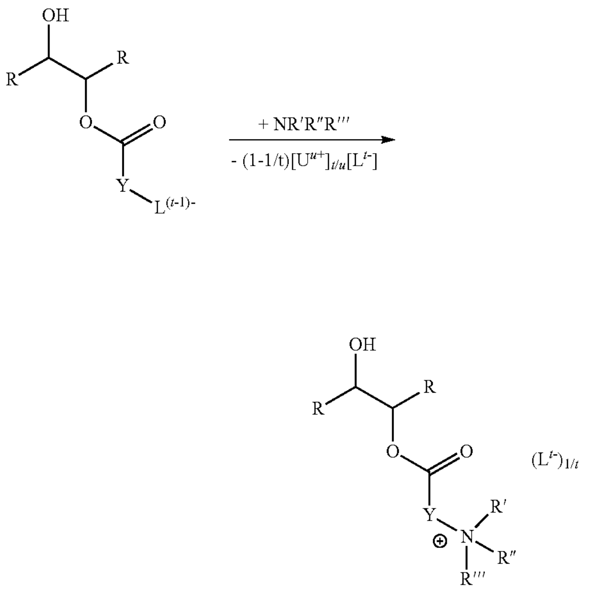

wherein R, R', R'', R''', Y, L, U, t and u are as described here before.

Optionally, together with the conversion of the monohydroxyl-monoester compound of formula (II) into the fabric softening active of formula (I), the diester compound of formula (IV) can be converted into the diammonium compound of formula (V)

(V)

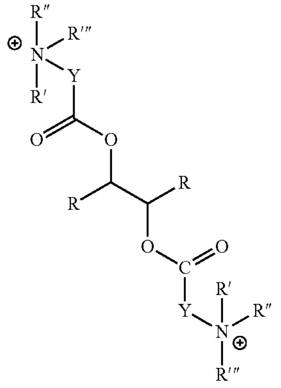

(or its electroneutral homologue) through the following reaction scheme:

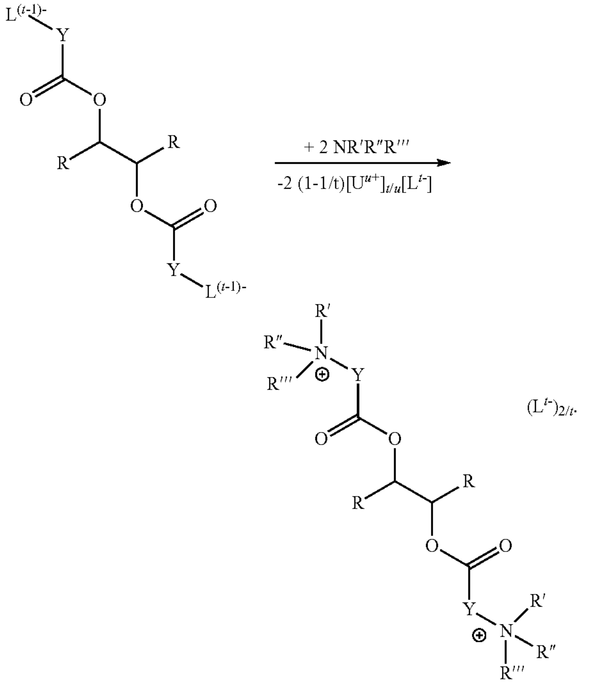

The amine condensation reaction is performed by contacting the intermediate monohydroxyl-monoester compound of formula (II), optionally together with the diester of formula (IV), with ammonia or an amine of formula NR'R''R''' where R', R'' and R''', are independently selected from, hydrogen or a C1 to $C_4$ alkyl group, and preferably R', R'' and R''' are exactly as above defined in connection with the ionic monoammonium compound of formula (I).

The reaction can be conducted at a temperature ranging from 15° C. to 250° C. in the presence of a suitable solvent. Examples of a suitable solvents include: THF, Me-THF, methanol, ethanol, isopropanol, DMSO, toluene, xylene or their mixture. Alternatively the reaction can be also conducted in the absence of any added solvent.

During this reaction, there is a nucleophilic attack of ammonia or of the amine that substitutes $L^{(t-1)-}$ in the monohydroxyl-monoester or the diester; $L^{(t-1)-}$ plays the role of the leaving group. $L^{t-}$ becomes the counter anion of the final ammonium compound. In the case the leaving group already carries a negative charge in the monohydroxyl-monoester or diester reagent (this is the case when (t−1) is greater than or equal to 1 or when t is greater than or equal to 2) there is also formation of a salt as the by-product of the reaction with the general chemical formula $[U^{u+}]_{t/u'}[L^{t-}]$.

Other Process for Synthesis of Compounds of Formula (I)

Acyloin Condensation

An alternative process for the synthesis of compounds of formula (I) proceeds via an acyloin condensation in accordance with the following scheme:

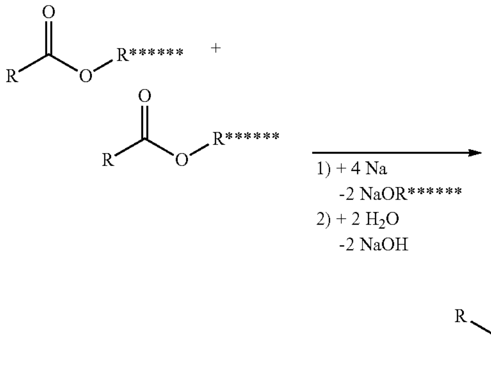

wherein R****** is an alkyl group having from 1 to 6 carbon atoms.

The acyloin condensation is generally performed by reacting an ester (typically a fatty acid methyl ester) with sodium metal as the reducing agent. The reaction be performed in a high boiling point aromatic solvent such as toluene or xylene where the metal can be dispersed at a temperature above its melting point (around 98° C. in the case of sodium). The reaction can be conducted at a temperature ranging from 100° C. to 200° C. At the end of the reduction, the reaction medium can be carefully quenched with water and the organic phase containing the desired acyloin product can be separated. The final product can be obtained after a proper work-up and the skilled person is aware of suitable techniques.

Reactions of this type have been described in the literature, e.g. in Hansley, J. Am. Chem. Soc 1935, 57, 2303-2305 or van Heyningen, J. Am. Chem. Soc. 1952, 74, 4861-4864 or in Rongacli et al., Eur. J. Lipd Sci. Technol. 2008, 110, 846-852, to which reference is made herewith for further details.

Keto-Alcohol Hydrogenation

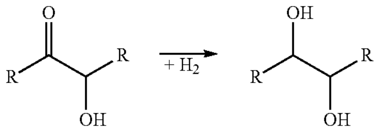

This reaction can be conducted using the conditions described hereinbefore for the first process variant for the manufacture of compounds of formula (I).

The obtained diol can then be directly esterified with the carboxylic acid reagent of formula (III) according to a classical Fisher esterification reaction. Standard conditions to perform esterification reactions are well known in the art so that no further details need to be further given here. During the course of the reaction, as there are two alcohol functions that can be esterified, there is first formation of the hydroxy-monoester (II) which can then be converted into the bis-ester (IV) in a consecutive reaction. The ratio between monoester (II) and diester (III) can be controlled during this step by limiting the conversion of (II) to (IV) according to the methods (C1) and/or (C3).

Finally the mixture of esters (II) and (III) are converted to the corresponding ammonium compounds (I) and (V) respectively according to the conditions described previously for the quaternization reaction.

The exemplary processes described before are examples of suitable processes, i.e. there might be other suitable processes to synthesize the compounds in accordance with the present invention. The processes described hereinbefore are thus not limiting as far as the methods of manufacture of the compounds according to the present invention is concerned.

The fabric softening actives described herein are biodegradable and provide a stability benefit. For optimal benefits the fabric conditioner preferably comprises an additionally fabric softening active according to formula (VI). In other words the fabric softening actives are present in a mixture $M_Q$ comprising:

- at least one fabric softening active according to formula (I) as above described, and
- at least one fabric softening active of formula (VI)

(VI)

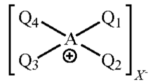

Wherein

A-1

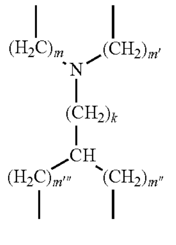

A-2

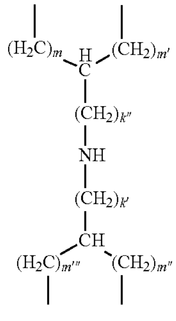

-continued

A-3

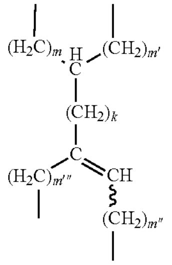

A-4

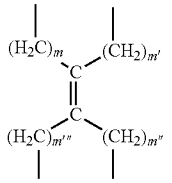

A-5

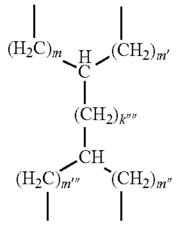

A-6

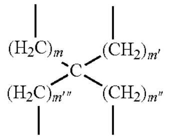

m, m', m'' and m''', are individually selected from 0, 1, 2 or 3, k, k' k'', k''' and k'''', are individually selected from 0, 1, 2 or 3, $Q_1$ to $Q_4$, are individually selected from the group consisting of R and X, R, as previously defined for the formula (I), X maybe individually selected from groups represented by formula (VII)

(VII)

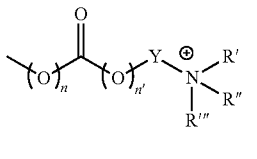

wherein two and only two of $Q_1$ to $Q_4$ are represented by X and two and only two of groups $Q_1$ to $Q_4$ are represented by R, Y, is as previously defined for the formula (I), R', R'' and R''' which may be the same or different at each occurrence, are as previously defined for formula (I), and n and n', are independently 0 or 1 with the sum of n+n' being 1 or 2

X is an anion are defined for formula (I).

It has been found that the combination of diammonium compounds of formula (VI), and monoammonium compounds of formula (I), exhibit outstanding stability properties.

It has been found that the diammonium compounds of formula (VI) exhibit a fairly good to excellent biodegradability, with an emphasis for the compounds of formula (V) which, like the compounds of formula (I), exhibit excellent biodegradability.

By adjusting the respective amounts of the fabric softener active of formula (I) and the fabric softener active of formula (VI) in the mixture $M_Q$, aqueous or hydro-alcoholic formulations in a broad range of viscosities can be prepared.

Preferably, the compound of formula (VI) is selected from the group consisting of compounds of formulae (V), (VIII), (IX), (X) and (XI), as represented here below:

(V)

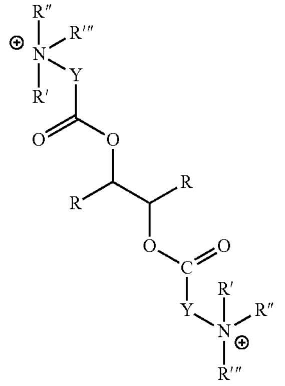

(VII)

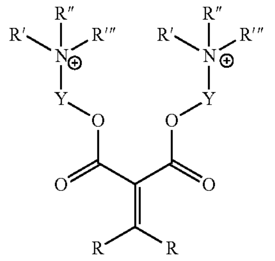

(IX)

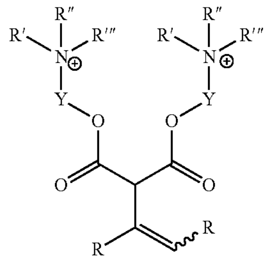

(X)

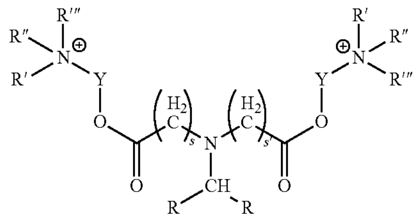

-continued (XI)

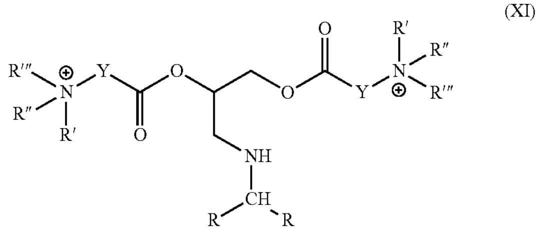

wherein

R, R', R'', R''' and Y, which may be the same or different at each occurrence, are as above described for formula (I), and s and s', are independently selected form 0, 1, 2 or 3.

Preferably, the compound of formula (VI) is a compound of formula (V).

The ratio of the weight of fabric softening active (I) over the combined weight of the fabric softening active (I) and fabric softening active (VI) in the mixture $M_Q$ may vary to a large extent, depending on the applications where $M_Q$ is intended to be used. The amount of fabric softening active (I) in the mixture $M_Q$ is generally from 1% to 99%, preferably from 10% to 90%. It may suitably be of at least 20%, preferably at least 30%, at least 40%, at least 50%, at least 60%, at least 70% or at least 80%. The range may be of at most 80%, preferably at most 70%, at most 60%, at most 50%, at most 40%, at most 30% or at most 20%. Examples of suitable ranges of amount of fabric softening active (I) in the mixture $M_Q$ is are 20% to 90%, 30% to 90%, 40% to 90%, 50% to 90%, 60% to 90%, 20% to 80%, 30% to 80%, [40% to 80%, 50% to 80%, 60% to 80%, 20% to 70%, 30% to 70%, 40% to 70%, 50% to 70% and 60% to 70%. A preferred amount of fabric softening active (I) in the mixture $M_Q$ is 20% to 80%, more preferably 30% to 70%, even more preferably 40% to 70%. These exemplified ranges may notably be well adapted for various applications using mixtures $M_Q$ wherein the compound of formula (VI) is a compound of formula (V). All % are wt. % of the mixture $M_Q$.

The fabric conditioners as described herein preferably comprise 0.5 to 50 wt. % of the composition, fabric softening actives according formula (I) or actives according to formula (I) in combination with actives according to formula (VI). More preferably the fabric conditioners comprise 0.5 to 30 wt. %, even more preferably 1 to 25 wt. %.

Perfumes:

The fabric conditioners of the present invention preferably comprise 0.1 to 30 wt. % perfume materials, i.e. free perfume and/or perfume microcapsules. As is known in the art, free perfumes and perfume microcapsules provide the consumer with perfume hits at different points during the laundry process. It is particularly preferred that the fabric conditioners of the present invention comprise a combination of both free perfume and perfume microcapsules.

Preferably the fabric conditioners of the present invention comprise 0.1 to 20 wt. % perfume materials, more preferably 0.5 to 15 wt. % perfume materials, most preferably 1 to 10 wt. % perfume materials.

Useful perfume components may include materials of both natural and synthetic origin. They include single compounds and mixtures. Specific examples of such components may be found in the current literature, e.g., in Fenaroli's Handbook of Flavor Ingredients, 1975, CRC Press; Synthetic Food Adjuncts, 1947 by M. B. Jacobs, edited by Van Nostrand; or Perfume and Flavor Chemicals by S. Arctander 1969, Montclair, N.J. (USA). These substances are well known to the person skilled in the art of perfuming, flavouring, and/or aromatizing consumer products.

Free Perfumes:

The fabric conditioners of the present invention preferably comprise 0.1 to 15 wt. % free perfume, more preferably 0.5 to 8 wt. % free perfume.

Particularly preferred perfume components are blooming perfume components and substantive perfume components. Blooming perfume components are defined by a boiling point less than 250° C. and a Log P or greater than 2.5. Substantive perfume components are defined by a boiling point greater than 250° C. and a Log P greater than 2.5. Boiling point is measured at standard pressure (760 mm Hg). Preferably a perfume composition will comprise a mixture of blooming and substantive perfume components. The perfume composition may comprise other perfume components.

It is commonplace for a plurality of perfume components to be present in a free oil perfume composition. In the compositions for use in the present invention it is envisaged that there will be three or more, preferably four or more, more preferably five or more, most preferably six or more different perfume components. An upper limit of 300 perfume components may be applied.

Perfume Microcapsules:

The fabric conditioners of the present invention preferably comprise 0.1 to 15 wt. % perfume microcapsules, more preferably 0.5 to 8 wt. % perfume microcapsules. The weight of microcapsules is of the material as supplied.

When perfume components are encapsulated, suitable encapsulating materials may comprise, but are not limited to; aminoplasts, proteins, polyurethanes, polyacrylates, polymethacrylates, polysaccharides, polyamides, polyolefins, gums, silicones, lipids, modified cellulose, polyphosphate, polystyrene, polyesters or combinations thereof.

Particularly preferred materials are aminoplast microcapsules, such as melamine formaldehyde or urea formaldehyde microcapsules.

Perfume microcapsules of the present invention can be friable microcapsules and/or moisture activated microcapsules. By friable, it is meant that the perfume microcapsule will rupture when a force is exerted. By moisture activated, it is meant that the perfume is released in the presence of water. The fabric conditioners of the present invention preferably comprise friable microcapsules. Moisture activated microcapsules may additionally be present. Examples of a microcapsules which can be friable include aminoplast microcapsules.

Perfume components contained in a microcapsule may comprise odiferous materials and/or pro-fragrance materials.

Particularly preferred perfume components contained in a microcapsule are blooming perfume components and substantive perfume components. Blooming perfume components are defined by a boiling point less than 250° C. and a Log P greater than 2.5. Preferably the encapsulated perfume compositions comprises at least 20 wt. % blooming perfume ingredients, more preferably at least 30 wt. % and most preferably at least 40 wt. % blooming perfume ingredients. Substantive perfume components are defined by a boiling point greater than 250° C. and a Log P greater than 2.5. Preferably the encapsulated perfume compositions comprises at least 10 wt. % substantive perfume ingredients, more preferably at least 20 wt. % and most preferably at least 30 wt. % substantive perfume ingredients. Boiling point is measured at standard pressure (760 mm Hg). Preferably a perfume composition will comprise a mixture of blooming and substantive perfume components. The perfume composition may comprise other perfume components.

It is commonplace for a plurality of perfume components to be present in a microcapsule. In the compositions for use in the present invention it is envisaged that there will be three or more, preferably four or more, more preferably five or more, most preferably six or more different perfume components in a microcapsule. An upper limit of 300 perfume components may be applied.

The microcapsules may comprise perfume components and a carrier for the perfume ingredients, such as zeolites or cyclodextrins.

Co-Softeners:

The fabric conditioners of the present invention preferably comprise a fatty co-softener. These are typically present at from 0.1 to 20 wt. % and particularly at from 0.4 to 15 wt. %, preferably 1 to 15 wt. % based on the total weight of the composition.

In the context of this invention a fatty cosoftener is considered to be a material comprising an aliphatic carbon chain. Preferably the carbon chain comprises more than 6 carbons, more preferably more than 8 carbons and preferably less than 30 carbons. The aliphatic chain may be saturated or unsaturated and my be branched or unbranched.

Preferred fatty co-softeners include fatty esters, fatty alcohols, fatty acids and combinations thereof. Fatty esters that may be employed include fatty monoesters, such as glycerol monostearate, fatty sugar esters and fatty acid mono-esters. Fatty acids which may be employed include hardened tallow fatty acid or hardened vegetable fatty acid (available under the trade name Pristerene™, ex Croda). Fatty alcohols which may be employed include tallow alcohol or vegetable alcohol, particularly preferred are hardened tallow alcohol or hardened vegetable alcohol (available under the trade names Stenol™ and Hydrenol™, ex BASF and Laurex™ CS, ex Huntsman). Preferably the fatty material is a fatty alcohol.

Preferably the fatty co-softener has a fatty chain length of C12 to C22, preferably C14 to C20.

The weight ratio of the softening active to the fatty co-softening agent is preferably from 10:1 to 1:2, more preferably 5:1 to 1:2, most preferably 3:1 to 1:2, e.g. 2:1 to 1:1.

When used in combination with tri-ethanol amine quaternary ester quats, fatty co-softeners are known to reduce the softening levels, however when combined with the softening actives described, surprisingly a softening benefit is demonstrated.

Non-Ionic Surfactants:

The fabric conditioners may further comprise a nonionic surfactant. Typically these can be included for the purpose of stabilising the compositions. Suitable nonionic surfactants include addition products of ethylene oxide and/or propylene oxide with fatty alcohols, fatty acids and fatty amines. Any of the alkoxylated materials of the particular type described hereinafter can be used as the nonionic surfactant.

Suitable surfactants are substantially water soluble surfactants of the general formula (XII):

$$R—Y—(C_2H_4O)_z—CH_2—CH_2—OH \quad (XII)$$

where R is selected from the group consisting of primary, secondary and branched chain alkyl and/or acyl hydrocarbyl groups; primary, secondary and branched chain alkenyl hydrocarbyl groups; and primary, secondary and branched chain alkenyl-substituted phenolic hydrocarbyl groups; the hydrocarbyl groups having a chain length of from 8 to about 25, preferably 10 to 20, e.g. 14 to 18 carbon atoms.

In the general formula for the ethoxylated nonionic surfactant, Y is typically:

—O—, —C(O)O—, —C(O)N(R)— or —C(O)N(R)R— in which R has the meaning given above for formula (XII), or can be hydrogen; and Z is at least about 8, preferably at least about 10 or 11.

Preferably the nonionic surfactant has an HLB of from about 7 to about 20, more preferably from 10 to 18, e.g. 12 to 16. Genapol™ C200 (Clariant) based on coco chain and 20 EO groups is an example of a suitable nonionic surfactant.

If present, the nonionic surfactant is present in an amount from 0.01 to 10 wt. %, more preferably 0.1 to 5 wt. %, based on the total weight of the composition.

A class of preferred non-ionic surfactants include addition products of ethylene oxide and/or propylene oxide with fatty alcohols, fatty acids and fatty amines. These are preferably selected from addition products of (a) an alkoxide selected from ethylene oxide, propylene oxide and mixtures thereof with (b) a fatty material selected from fatty alcohols, fatty acids and fatty amines.

Suitable surfactants are substantially water soluble surfactants of the general formula (XIII):

$$R—Y—(C_2H_4O)_z—CH_2—CH_2—OH \quad (XIII)$$

where R is selected from the group consisting of primary, secondary and branched chain alkyl and/or acyl hydrocarbyl groups (when Y=—C(O)O, R≠an acyl hydrocarbyl group); primary, secondary and branched chain alkenyl hydrocarbyl groups; and primary, secondary and branched chain alkenyl-substituted phenolic hydrocarbyl groups; the hydrocarbyl groups having a chain length of from 10 to 60, preferably 10 to 25, e.g. 14 to 20 carbon atoms.

In the general formula for the ethoxylated nonionic surfactant, Y is typically:

—O—, —C(O)O—, —C(O)N(R)— or —C(O)N(R)R— in which R has the meaning given above for formula (XIII), or can be hydrogen; and Z is at least about 6, preferably at least about 10 or 11.

Lutensol™ AT25 (BASF) based on C16:18 chain and 25 EO groups is an example of a suitable non-ionic surfactant. Other suitable surfactants include Renex 36 (Trideceth-6), ex Croda; Tergitol 15-S3, ex Dow Chemical Co.; Dihydrol LT7, ex Thai Ethoxylate ltd; Cremophor CO40, ex BASF and Neodol 91-8, ex Shell.

Cationic Polymer:

The compositions of the present invention may comprise a cationic polymer. This refers to polymers having an overall positive charge.

The cationic polymer may be naturally derived or synthetic. Examples of suitable cationic polymers include: acrylate polymers, cationic amino resins, cationic urea resins, and cationic polysaccharides, including: cationic celluloses, cationic guars and cationic starches.

The cationic polymer of the present invention may be categorised as a polysaccharide-based cationic polymer or non-polysaccharide based cationic polymers.

Polysaccharide based cationic polymers include cationic celluloses, cationic guars and cationic starches. Polysaccharides are polymers made up from monosaccharide monomers joined together by glycosidic bonds.

The cationic polysaccharide-based polymers present in the compositions of the invention have a modified polysaccharide backbone, modified in that additional chemical groups have been reacted with some of the free hydroxyl groups of the polysaccharide backbone to give an overall positive charge to the modified cellulosic monomer unit.

A non-polysaccharide-based cationic polymer is comprised of structural units, these structural units may be non-ionic, cationic, anionic or mixtures thereof. The polymer may comprise non-cationic structural units, but the polymer must have a net cationic charge.

The cationic polymer may consist of only one type of structural unit, i.e., the polymer is a homopolymer. The cationic polymer may consist of two types of structural units, i.e., the polymer is a copolymer. The cationic polymer may consist of three types of structural units, i.e., the polymer is a terpolymer. The cationic polymer may comprise two or more types of structural units. The structural units, or monomers, may be incorporated in the cationic polymer in a random format or in a block format.

The cationic polymer may comprise a nonionic structural units derived from monomers selected from: (meth)acrylamide, vinyl formamide, N,N-dialkyl acrylamide, N,N-dialkylmethacrylamide, C1-C12 alkyl acrylate, C1-C12 hydroxyalkyl acrylate, polyalkylene glycol acrylate, C1-C12 alkyl methacrylate, C1-C12 hydroxyalkyl methacrylate, polyalkylene glycol methacrylate, vinyl acetate, vinyl alcohol, vinyl formamide, vinyl acetamide, vinyl alkyl ether, vinyl pyridine, vinyl pyrrolidone, vinyl imidazole, vinyl caprolactam, and mixtures thereof.

The cationic polymer may comprise a anionic structural units derived from monomers selected from: acrylic acid (AA), methacrylic acid, maleic acid, vinyl sulfonic acid, styrene sulfonic acid, acrylamidopropylmethane sulfonic acid (AMPS) and their salts, and mixtures thereof.

The molecular weight of the cationic polymer is preferably greater than 20 000 g/mol, more preferably greater than 25 000 g/mol. The molecular weight is preferably less than 2 000 000 g/mol, more preferably less than 1 000 000 g/mol.

Fabric conditioners according to the current invention preferably comprise cationic polymer at a level of 0.1 to 10 wt. % of the formulation, preferably 0.25 to 7.5 wt. % of the formulation, more preferably 0.35 to 5 wt. % of the formulation.

Other Ingredients:

The fabric conditioners may comprise other ingredients of fabric softener liquids as will be known to the person skilled in the art. Among such materials there may be mentioned: antifoams, insect repellents, shading or hueing dyes, preservatives (e.g. bactericides), pH buffering agents, perfume carriers, hydrotropes, anti-redeposition agents, soil-release agents, polyelectrolytes, anti-shrinking agents, anti-wrinkle agents, anti-oxidants, dyes, colorants, sunscreens, anti-corrosion agents, drape imparting agents, anti-static agents, sequestrants and ironing aids. The products of the invention may contain pearlisers and/or opacifiers. A preferred sequestrant is HEDP, an abbreviation for Etidronic acid or 1-hydroxyethane 1,1-diphosphonic acid.

In Use:

In one aspect of the present invention, fabric is washed with the fabric conditioner compositions described herein. The treatment is preferably during the washing process. This may be hand washing or machine washing. Preferable the fabric conditioner is used in the rinse stage of the washing process.

Preferably the fabric is treated with a 10 to 100 ml dose of fabric conditioner for a 3 to 7 kg load of clothes. More preferably, 10 to 80 ml for a 3 to 7 kg load of clothes.

The composition as described herein have improved stability characteristics. This is provided by the selection of the fabric softening active. The improved stability may be demonstrated by improved perfume microcapsule suspension or improved shelf life stability. The compositions of the present invention may be used in a method of suspending perfume microcapsules, in which perfume microcapsules are added to a formulation comprising a fabric softening actives as described herein.

EXAMPLES

Example 1—Synthesis of a Quaternary Monoammonium Compound of Formula (I) Starting from C16-C18 (30:70) Fatty Acid Cut Part 1. A—Piria Ketonization Toward Internal $C_{31}$-$C_{35}$ Ketones Cut.

The reaction was conducted under an inert argon atmosphere in a 200 mL quartz reactor equipped with a mechanical stirring (A320-type stirring mobile manufactured by 3D-printing with Inox SS316L), an insulated addition funnel, a distillation apparatus, a heating mattress and a temperature probe.

In the reactor were introduced:

- 12.5 g of MASCID™ acid 1865 (from Musim Mas Group) composed of 33.7 wt % of palmitic acid and 65.3 wt % of stearic acid (0.045 mole of fatty acids), and
- 0.935 g of MgO (0.023 mole).

In the insulated addition funnel were added 37.5 g of the same melted fatty acids mixture (0.135 mole).

The temperature of the reaction media was then raised to 250° C. Once the temperature reached 150° C., stirring was started (1200 rpm). After 2h00 reaction time at 250° C., FTIR analysis showed complete conversion of the starting fatty acids into the intermediate magnesium carboxylate complex.

The temperature of the reaction mass was then raised further to 330° C. and the mixture was allowed to stir at this temperature for 1 h30 in order to allow decomposition of the intermediate magnesium carboxylate complex to the desired ketone.

Then, 12.5 g of the melted fatty acid mixture was progressively added into the reactor via an addition funnel over a 30 minute period and the mixture was stirred at 330° C. for an additional 1 hour. FTIR analysis showed complete conversion of fatty acids and magnesium complex to the desired ketone.

Two additional cycles of 12.5 g fatty acid addition during a 30 minute period followed by additional 1 hour stirring at 330° C. were then completed.

After the last cycle the mixture was allowed to stir at 330° C. for an additional 1 h00 to ensure complete conversion of the intermediate magnesium complex to the desired ketone which was confirmed by FTIR analysis.

The temperature of the reaction mixture was then allowed to cool down at room temperature and the crude was solubilized in hot $CHCl_3$. The suspension was filtered on a plug of silica (70 g) and the product was further eluted with additional amounts of $CHCl_3$.

After solvent evaporation 41.83 g (0.086 mole) of product was obtained as a white wax corresponding to an isolated yield of 96%.

$^1$H NMR ($CDCl_3$, 400 MHz) δ (ppm): 2.45-2.25 (t, J=7.6 Hz, 4H), 1.62-1.46 (m, 4H), 1.45-1.05 (m, 54H), 0.86 (t, J=6.8 Hz, 6H).

$^{13}C$ NMR ($CDCl_3$, 101 MHz) δ (ppm): 212.00, 43.05, 32.16, 29.93, 29.91, 29.88, 29.84, 29.72, 29.65, 29.59, 29.51, 24.13, 22.92, 14.34 (terminal $CH_3$).

Part 1. B—Hydrogenation of Ketones Mixture Toward Internal C31-C35 Fatty Alcohols Mixture In a 100 mL autoclave equipped with a mechanical stirrer (Rushton turbine) were added:

4.36 g of Ru/C (4.87% Ru) catalyst (5 wt. % of dry catalyst with respect to the ketone, catalyst containing 54.9% $H_2O$)

39.3 g (87.2 mmol) of melted internal $C_{31}$-$C_{35}$ ketones cut.

The reaction was performed under 20 bar hydrogen pressure. 4 nitrogen purges are performed followed by 3 purges of hydrogen at 20 bars. The temperature of the reaction mixture was then set at 100° C. to melt the ketone substrate. The temperature was left at 100° C. for 10 min and stirring was slowly started at 200 rpm. When proper stirring was confirmed, the stirring rate was increased at 1200 rpm and the temperature was set at 150° C.

After 6 h reaction time at 150° C., heating was stopped and the mixture was allowed to cool down at 90° C. while stirring. Stirring was then stopped. The mixture was cooled down to room temperature and the autoclave was carefully depressurized.

NMR analysis in $CDCl_3$ of the crude showed a ketone conversion level >99% and molar purity of 99% for the fatty alcohol. The compact solid containing the product and the catalyst was grounded to powder and then introduced into a 1 L flask. 500 mL of chloroform were added and the flask was then heated at 60° C. to dissolve completely the alcohol. The suspension was filtered at 60° C. over celite. The solid cake was rinsed with hot chloroform at 60° C. several times. The filtrate was evaporated to give white powder with a weight purity of about 99% for the desired internal $C_{31}$-$C_{35}$ fatty alcohols mixture corresponding to about 90% isolated yield.

Part 1. C—Dehydration of C31-C35 Fatty Alcohols into Internal Olefins

All the reactions were conducted under an inert argon atmosphere.

In a 200 mL quartz reactor equipped with a heating mattress, a mechanical stirrer (A320-type stirring mobile manufactured by 3D-printing with Inox SS316L), surmounted by a condenser connected to a 50 mL two-neck distillate collection flask and a temperature probe were added:

41.3 g of $C_{31}$-$C_{35}$ fatty alcohols (85 mmol, 1 eq.), and 4.13 g (40 mmol, 10 wt %) of $Al_2O_3$-η.

The temperature of the reaction media was increased to 150° C. to melt the alcohol and stirring was started (about 500 rpm). Then, the temperature was set-up at 300° C. and the mixture was allowed to stir at 1000 rpm under argon. The reaction progress was monitored thanks to NMR analysis with a borosilicate glass tube.

After 2 hours reaction at 300° C., NMR analysis in $CDCl_3$ showed complete conversion of the fatty alcohol and the presence of 1.5 mol % of ketone which had been formed as a by-product.

Stirring and heating were then stopped and the temperature was lowered to 80° C. The molten crude was transferred to a beaker. The reactor vessel and the stirring mobile were rinsed with chloroform ($Al_2O_3$ is insoluble).

The mixture was filtered and the solvent was evaporated under vacuum to afford 39 g of a clear yellow oil which solidified at room temperature to give a white solid in the form of wax (98 wt % purity) corresponding to 97% yield (NMR).

$^{1}H$ NMR ($CDCl_3$, 400 MHz) δ (ppm): 5.38-5.29 (m, 2H), 2.03-1.93 (m, 4H), 1.35-1.19 (m, 55H (average H number)), 0.86 (t, J=6.8 Hz, 6H).

$^{13}C$ NMR ($CDCl_3$, 101 MHz) δ (ppm): 130.6, 130.13, 32.84, 32.16, 30.01, 29.93, 29.8, 29.6, 29.55, 29.4, 22.93, 14.35 (terminal $CH_3$).

Part 1. D—Epoxidation of Internal Olefins to Afford C31-C35 Oxiranes

The reaction was conducted under an inert argon atmosphere.

In a 300 mL double-jacketed reactor equipped with a mechanical stirrer (propeller with four inclined plows) and baffles, a condenser and a temperature probe were added:

38.2 g of $C_{31-35}$ internal olefins (98 wt % purity, 80 mmol)

6.9 mL (7.2 g, 120 mmol) of acetic acid, and −11.3 g (30 wt %) of Amberlite® IR 120H resin.

The mixture was heated to 75° C. to melt the fatty alkene. The agitation was then started and 12.3 mL (13.7 g, 120 mmol) of $H_2O_2$ 30% were slowly added into the mixture using an addition funnel while monitoring temperature of the reaction medium to prevent temperature increase of the reaction mass (exothermicity). This required about 20 min. During the addition, the agitation was increased to improve transfers due to the heterogeneous nature of the reaction media.

At the end of the addition, the temperature of the reaction medium was increased at 85° C. and after 6 h10 of stirring at this temperature, NMR analysis showed that the conversion level was around 99% with 98% selectivity.

Heating was then stopped and 150 mL of chloroform were added when the temperature of the reaction mass was around 50° C. The mixture was transferred to a separating funnel and the organic phase was washed 3 times with 150 mL of water. The resin catalyst that stayed in the aqueous phase was removed during phase separation. The aqueous phase was extracted twice with 50 mL of chloroform. The organic phase was dried over $MgSO_4$, filtered and evaporated to afford 39.2 g of a white solid with a purity of 98 wt % (epoxide+dialcohol by-product). The yield taking into account the purity was 99%.

$^{1}H$ NMR ($CDCl_3$, 400 MHz) δ (ppm): 2.91-2.85 (m, 1.5H), 2.65-2.6 (m, 0.5H), 1.53-1.36 (m, 4H), 1.35-1.19 (m, 55H (aver. H number)), 0.86 (t, J=6.8 Hz, 6H).

$^{13}C$ NMR ($CDCl_3$, 101 MHz) δ (ppm): 58.97, 57.28, 32.18, 31.96, 29.72, 29.6, 29.4, 27.86, 26.95, 26.63, 26.09, 22.72, 14.15 (terminal $CH_3$).

Part 1. E—Epoxide Ring Opening with Chloroacetic Acid to Afford Chloroacetate Monoester $C_{31-35}$

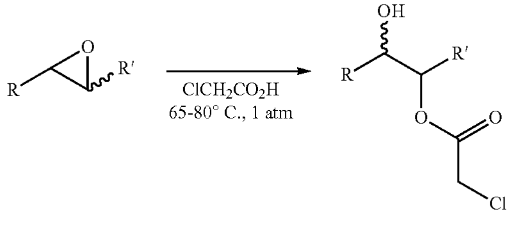

The reaction was conducted under an inert argon atmosphere. In a 500 mL three necked round bottom flask equipped with a magnetic stirrer, a heater, a condenser, a temperature probe and an insulated addition funnel, were added 44.2 g of chloroacetic acid (463 mmol, 5 eq.)

In the insulated addition funnel maintained at 80° C. were added 45 g of melted $C_{31-35}$ fatty epoxide (purity: 99.97 wt %, 92.6 mmol, 1 eq.)

The 1st step of hydroxy-ester formation through oxirane opening was conducted at 65° C. to limit the formation of ketone and dehydration byproducts. The melted fatty epoxide was progressively added drop-wise over 1 h20 into the reaction media containing melted chloroacetic acid under stirring at 65° C. The progressive addition of epoxide was carried out in order to limit by-products formed by condensation between two epoxide molecules. At the end of epoxide addition, the mixture was stirred at 65° C. for 1 h30.

The 2nd step of hydroxy-ester formation through oxirane opening was conducted by an additional stirring at 80° C. for 1 hour.

NMR analysis ($CDCl_3$) of the crude showed complete conversion of the starting epoxide and a 88:12 mol % monoester:bisester mixture composition.

Part 1. F—Optional Further Reaction with Chloroacetic Acid to Afford the Partial Conversion of the Chloroacetate Monoester C31-35 into the Corresponding Diester

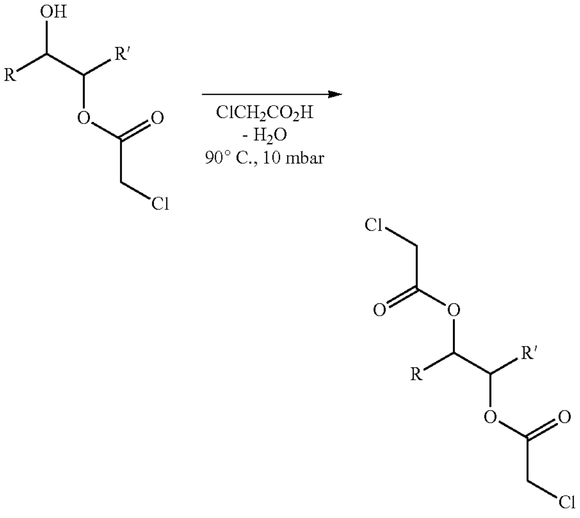

The condenser was replaced by a curved distillation column and the temperature of the reaction medium, that is to say the previously obtained crude having a 88:12 mol % monoester:bisester mixture composition, was increased to 90° C. followed by a progressive pressure decrease down to 10 mbar in order to distillate chloroacetic acid excess and to remove water formed as by-product.

After 1 h30 of distillation at 90° C. (10 mbar), $^1H$ NMR analysis showed a monoester:bisester ratio of 74:26 mol % with remaining chloroacetic acid.

At this stage the distillation was stopped and the mixture was allowed to cool down to room temperature. The crude was then solubilized into 150 ml of toluene and transferred into a separating funnel. The organic phase was washed 3 times with 150 ml of an aqueous NaOH solution (0.1 M) followed by 150 ml of brine. The organic phase was separated, dried over $MgSO_4$, filtered and evaporated to give 53 g of a residual beige oil.

$^1H$ NMR ($CDCl_3$) after solvent evaporation showed the approximate composition of the beige oil: 66 wt % (70 mol %) of chloroacetate hydroxyester, 26 wt % (25 mol %) of chloroacetate bisester, wt % (3 mol %) of monoester dimer, 2 wt % (1 mol %) of bisester dimer, 0.2 wt % (0.3 mol %) of ketone and 0.2 wt % (1 mol %) of chloroacetic acid.

The final yield in the chloroacetate mono+bisester taking into account the purity of the mixture was ~88%.

$^1H$ NMR ($CDCl_3$, 400 MHz) δ (ppm): 5.11-5.02 (m, 2H, diester), 4.96-4.83 (m, 1H, monoester), 4.07 (s, 1H, monoester), 4.06 (s, 1H, monoester), 4.04 (s, 2H, diester), 4.03 (s, 2H, diester), 3.74-3.67 (m, 1H, isomer 1, monoester), 3.64-3.54 (m, 1H, isomer 2, monoester), 1.73-1.61 (m, 2H, monoester), 1.61-1.48 (m, 4H, diester), 1.48-1.36 (m, 2H, monoester), 1.36-1.12 (m, 55H (average number)), 0.86 (t, J=6.8 Hz, 6H).

$^{13}C$ NMR ($CDCl_3$, 101 MHz) δ (ppm): 167.39, 167.27, 167.15, 167, 79.84, 78.97, 76.21, 75.83, 72.95, 72.41, 41.06, 41.01, 40.90, 40.80, 33.63, 32.18, 31.98, 30.57, 29.75, 29.72, 29.65, 29.59, 29.5, 29.42, 28.85, 28.61, 25.9 25.6, 24.48 25.33, 24.97, 22.74, 14.15 (terminal $CH_3$).

Part 1. G—Quaternization with $NMe_3$

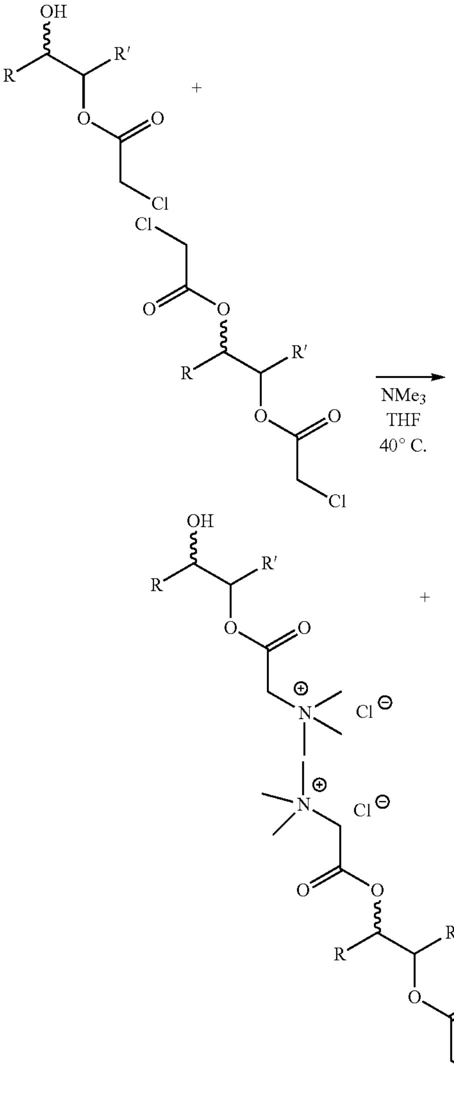

The reaction was conducted under an inert argon atmosphere. In a double-jacketed 1 L reactor equipped with a mechanical stirrer, a condenser, a temperature probe, a trap containing 0.1 N HCl solution followed by a second trap containing activated carbon pellets, were added:

52 g (92.4 wt % purity, 80 mmol, 1 eq.) of a mixture of about 72 wt. % (74 mol. %) chloroacetate hydroxy-ester and about 28 wt. % (26 mol. %) of chloroacetate bisester, as obtainable upon completion of part 1-F, and 171 ml (320 mmol, 4 eq.) of a trimethylamine/THF solution (13 wt % concentration).

The reaction mixture was then heated at 40° C. and stirred at 1000 rpm. Reaction progress was followed up thanks to $^1$H NMR analysis. After 6 hours stirring at 40° C., NMR analysis ($CD_3OD$) showed complete conversion of chloroacetate esters and selective formation of the corresponding glycine betaine esters with the following approximate composition: 70 mol % of glycine betaine hydroxy-ester and 25 mol % of glycine betaine bisester.

The reactor was drained, rinsed with THF and the solvent was evaporated under vacuum to afford 58.8 g of a beige wax with the following weight composition: 65.2 wt. % glycine betaine monohydroxy-ester, 27.6 wt. % of glycine betaine bisester, 4.7 wt. % of dimer monoester, 2.2 wt. % of dimer bisester and 0.18 wt % of ketone.

The global yield in glycine betaine monohydroxy-ester plus glycine betaine bisester taking into account product purity was 98%. The glycine betaine monohydroxy-ester over (glycine betaine monohydroxy-ester plus glycine betaine bisester) weight ratio was 70%.

$^1$H NMR (MeOD-d4, 400 MHz) δ (ppm): 5.17-5.06 (m, 2H, diquat), 5.02-4.87 (m, 1H, monoquat), 5.26-4.17/4.84-4.76/4.6-4.51/4.47-3.32 (m, 2H: monoquat, 4H: diquat), 3.41 (s, 18H, isomer 1, diquat), 3.38 (s, 18H, isomer 2, diquat), 3.36 (s, 9H, monoquat), 3.72-3.64 (m, 1H, isomer 1, monoquat), 3.56-3.47 (m, 1H, isomer 2, monoquat), 1.75-1.53 (m, 2H, monoquat), 1.53-1.44 (m, 4H, diquat), 1.44-1.35 (m, 2H, monoquat), 1.35-1.12 (m, 55H (average number)), 0.86 (t, J=6.8 Hz, 6H).

13C NMR (MeOD-d4, 101 MHz) δ (ppm): 165.46, 165.17, 81.33, 80.77, 77.17, 76.46, 72.35, 72.18, 63.89, 63.81, 63.54, 63.08, 54.46, 54.37, 54.22, 33.70, 32.51, 32.06, 31.18, 30.27, 30.03, 29.94, 29.8, 29.04, 28.8, 26.6, 26.3, 26.1, 26, 25.8, 23.24, 14.45 (terminal $CH_3$).

Part 1. H—Purification of a Crude Richer in Chloroacetate Monoester $C_{31-35}$

A crude having a 88:12 mol % monoester:bisester mixture composition as obtainable upon completion of part 1-E is allowed to cool down to room temperature. The crude is then solubilized into toluene and transferred into a separating funnel. The organic phase is washed 3 times with an aqueous NaOH solution (0.1 M) followed by brine. The organic phase is separated, dried over $MgSO_4$, filtered and evaporated to give a purified material rich in chloroacetate monoester $C_{31-35}$, having approximately a 88:12 mol % monoester:bisester mixture composition, and an overall monoester plus bisester content of about 95 wt. %.

Part 1. I—Quaternization with $NMe_3$ of a Crude Richer in Chloroacetate Monoester $C_{31-35}$ A quaternization reaction of the purified material obtained upon completion of part 1. H is achieved using the same quaternization reaction and purification protocols as described under part 1. G.

At the end, a purified surfactant material QA2 having approximately a 90:10 wt. % glycine betaine monohydroxy-ester:glycine betaine bisester mixture composition, and an overall glycine betaine bisester plus glycine betaine monoester content of about 95 wt. %, is obtained.

Example 2—Additional Mixtures of Monoquaternary Ammonium Compounds of Formula (I) with Diquaternary Ammonium Compounds Part 2. A—Synthesis of a Diquaternary Ammonium Compound of Formula (VI) Starting from $C_{31\ 16}$-hentriacontanone a) Obtainment of $C_{31}$ Internal Olefin $C_{31}$ internal olefin was obtained from palmitic acid according to the protocol described in U.S. Pat. No. 10,035,746, example 4.

b) Epoxidation of Internal Olefin to Fatty Epoxide

The reaction was conducted under an inert argon atmosphere.

In a 1 L double-jacketed reactor equipped with a mechanical stirrer (propeller with four inclined plows), a condenser, an addition funnel and a temperature probe were added 61.9 g of $C_{31}$ alkene (0.142 mol), followed by 16.3 mL (17.1 g, 0.285 mol) of acetic acid and 13.6 g (22 wt. %) of Amberlite® IR 120H resin. The mixture was heated to 65° C. to melt the fatty alkene. The agitation was started and then 21.8 mL (24.2 g, 0.214 mol) of an aqueous solution of $H_2O_2$ (conc. 30%) was slowly added to the mixture using the addition funnel at a rate avoiding a significant temperature increase. This required about one hour. The temperature was then increased to 75° C. and the reaction mixture was allowed to stir overnight (after 15 min, NMR analysis showed that the conversion level was already around 60% with 99% selectivity). Then additional 10.2 mL (11.3 g, 0.1 mol) of an aqueous solution of H2O2 (30%) was added slowly and after 4 hours following the second addition of $H_2O_2$ NMR analysis showed that the conversion level was around 88% (98% selectivity). Another addition of 8.14 mL of acetic acid (8.55 g, 0.142 mol) followed by 11.6 mL of 30% $H_2O_2$ (12.91 g, 0.114 mol) was finally performed in order to increase the conversion level.

The mixture was allowed to stir a second night at 75° C.

Finally NMR analysis showed a conversion level of 93% (95% selectivity).

The mixture was allowed to cool down to room temperature and then 300 mL of chloroform were added. The mixture was transferred to a separating funnel and the organic phase was washed three times with 300 mL of water and then the aqueous phase was extracted twice with 100 mL of chloroform. The Amberlite® solid catalyst stayed in the aqueous phase and was removed during the first separation with the aqueous phase. The organic phases were collected, dried over $MgSO_4$, filtered and evaporated to give 65.3 g of a white solid with a purity of 91% w/w (epoxide+dialcohol).

The yield taking into account the purity was 92%.

$^1$H NMR ($CDCl_3$, 400 MHz) δ (ppm): 2.91-2.85 (m, 2H, diastereoisomer 1), 2.65-2.6 (m, 2H, diastereoisomer 2), 1.53-1.00 (m, 54H), 0.86 (t, J=6.8 Hz, 6H).

$^{13}C$ NMR ($CDCl_3$, 101 MHz) δ (ppm): 58.97, 57.28, 32.18, 31.96, 29.72, 29.6, 29.4, 27.86, 26.95, 26.63, 26.09, 22.72, 14.15 (terminal $CH_3$).

c) Hydrolysis of Fatty Epoxide to Afford Fatty Diol

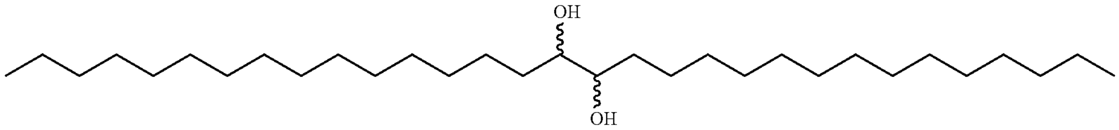 [SMILES: CCCCCCCCCCCCCCCC(O)C(O)CCCCCCCCCCCCCC]

The reaction was conducted under an inert argon atmosphere.

In a 1 L double-jacketed reactor equipped with a mechanical stirrer (propeller with four inclined plows), a condenser and a temperature probe were added 82.9 g of $C_{31}$ epoxide (purity: 94.5 wt %, 0.174 mol) followed by 480 mL of methyl-THF.

The mixture was allowed to stir at room temperature and 73 mL of a 3 M aqueous solution of $H_2SO_4$ was then added. The reaction medium was then stirred at 80° C. for 90 minutes. NMR analysis showed that the reaction was completed. The biphasic mixture was allowed to cool down to room temperature and the organic phase was separated. The solvent was then removed under vacuum and the residue was suspended in 200 mL of diethyl ether. The suspension was filtered and the resulting solid was washed 3 times with 50 mL of diethyl ether. The white solid was finally washed 2 times with 50 mL of methanol and was dried under vacuum to remove traces of solvent.

At the end 75.53 g of product was obtained as a white powder with a purity of 95.7% w/w corresponding to a yield of 89%.

$^1H$ NMR ($CDCl_3$, 400 MHz) δ (ppm): 3.61-3.55 (m, 2H, diastereoisomer 1), 3.43-3.25 (m, 2H, diastereoisomer 2), 1.88 (brd, J=2.4 Hz, OH, diastereoisomer 2), 1.72 (brd, J=3.2 Hz, OH, diastereoisomer 1), 1.53-1.10 (m, 54H), 0.86 (t, J=6.8 Hz, 6H).

$^{13}C$ NMR ($CDCl_3$, 101 MHz) δ (ppm): 74.71, 74.57, 33.66, 31.96, 31.23, 29.71, 29.39, 26.04, 25.68, 22.72, 14.15 (terminal CH3)

d) Esterification of Fatty Diol with Trimethylglycine to Afford Compound of Formula (V)

All the reactions were conducted in carefully dried vessels and under an inert argon atmosphere.

Fresh commercial anhydrous $CHCl_3$ (amylene stabilized) and anhydrous toluene were used as such.

Betaine hydrochloride (19.66 g, 128.4 mmoles) was washed ten times with 20 mL of anhydrous THF followed by drying under vacuum to remove traces of solvent prior to use.

In a 100 mL four-neck round-bottom flask equipped with a magnetic stirrer, a heater, a condenser, a temperature probe and a curved distillation column connected to two traps of NaOH were quickly added: 19.66 g of dried betaine hydrochloride (128.4 mmoles) and 28 mL of SOCl2 (45.86 g, 0.386 mol).

The heterogeneous mixture was stirred and the temperature was then slowly increased to 70° C. It was observed that when the temperature reached 68° C., gas was released ($SO_2$ and HCl) and the mixture turned homogeneous yellow.

The mixture was then allowed to stir at 70° C. for two hours and hot anhydrous toluene (25 mL, 80° C.) was added into the vessel. The mixture was stirred and then decanted at 0° C. (white-yellow precipitate formation) and the upper phase of toluene was removed through a cannula. The operation of toluene washing was repeated seven times in order to remove all $SOCl_2$ excess. NMR analysis showed complete conversion of glycine betaine hydrochloride but also formation of $NMe_3$·HCl adduct ($NMe_3$·HCl content in the solid: 12.3 mol %).

20 mL of dry $CHCl_3$ was then added to the solid betainyl chloride.

A solution of 26.19 g (56 mmol) of fatty diol in 90 mL of anhydrous $CHCl_3$ was prepared at 55° C. and was added dropwise under stirring to the reaction vessel at room temperature (exothermicity and emission of HCl was observed). The mixture was then allowed to stir at 55° C. overnight. Over the course of the reaction, the mixture turned homogeneously orange. NMR analysis showed that the conversion level was around 100%.

The mixture was then allowed to cool down to room temperature and the solvent was evaporated under vacuum.

The residue was solubilized in methanol at 0° C. and the formed precipitate was filtered out. The obtained filtrate was then evaporated to give 39.7 g of crude product.

This product was then deposited on a sinter filter and washed with cyclohexane to remove some remaining organic impurities. The resulting washed solid was dried under vacuum to afford 22 g of crude material. A final purification with a mixture of $CH_2Cl_2$/cyclohexane 50:50 was carried out; the solid was solubilized again in this solvent mixture at 50° C. and was allowed to cool down to room temperature. The formed precipitate was filtered out and after evaporation of the filtrate 19 g of a beige wax QA3 was obtained with the following composition: 95 wt % of glycine betaine diester, corresponding to a compound of formula (V) 1.5 wt % of methyl betainate 2 wt % of trimethylamine hydrochloride 1.5 wt % of glycine betaine hydrochloride.

The purified yield was 44%. No presence of glycine betaine monoester compound of formula (I) was identified in wax QA3.

$^1H$ NMR (MeOD-d4, 400 MHz) δ (ppm): 5.3-5.2 (m, 2H), 4.68 (d, J=16.8 Hz, 2H), 4.50 (d, J=16.8 Hz, 2H), 4.53 (s, 1H), 4.48 (s, 1H), 3.37 (s, 18H), 1.75-1.55 (m, 4H), 1.39-1.10 (m, 50H), 0.9 (t, J=6.8 Hz, 6H).

$^{13}C$ NMR (MeOD-d4, 101 MHz) δ (ppm): 164.58, 75.76, 62.43, 53.10, 31.68, 30.05, 29.41, 29.38, 29.33, 29.28, 29.15, 29.09, 28.96, 24.71, 22.34, 13.05 (terminal $CH_3$).

Part 2. B—Synthesis of a Mixture of Diquaternary Ammonium Compounds of Formulae (X) and (XI) Starting from $C_{31-16}$-Hentriacontanone a) Knoevenagel Condensation to Provide Diester Intermediate:

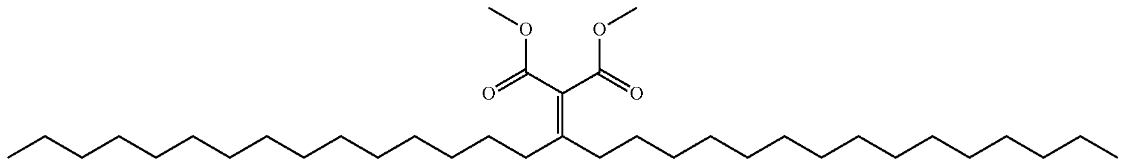 [SMILES: CCCCCCCCCCCCCCCC(CCCCCCCCCCCCCCC)=C(C(=O)OC)C(=O)OC]

All the reactions were conducted in carefully dried vessels and under an inert argon atmosphere.

Fresh commercial anhydrous $CHCl_3$, anhydrous THF and anhydrous pyridine were used as such.

In a 1 L double-jacketed reactor equipped with a mechanical stirrer (propeller with four inclined plows), a condenser, an addition funnel and a temperature probe were added 36.5 mL of $TiCl_4$ (63.00 g, 0.332 mole), followed by 146.3 mL of $CHCl_3$.

The mixture was stirred at −10° C. and anhydrous THF (358 mL) was slowly added through the addition funnel at a rate avoiding a temperature increase of the reaction medium above +5° C. During THF addition, a yellow precipitate appeared. Then 15.3 mL of dimethyl malonate (17.69 g, 0.134 mole) were added into the reaction mixture which was then allowed to stir at room temperature for 1 hour in order to allow malonate complexation to occur.

Then the mixture was allowed to cool down to 0° C. and a solution of 71.80 mL of anhydrous pyridine (70.50 g, 0.891 mole) in 23 mL of THF was slowly added into the reactor. During addition, the colour of the mixture turned red. The mixture was then allowed to stir at room temperature for 20 minutes to allow deprotonation to occur.

Finally, 50.00 g of $C_{31}$ ketone (0.111 mole) was added into the reaction mixture which was allowed to stir at room temperature for one night and one more day at 35° C. 250 mL of water were then carefully added into the reactor followed by 250 mL of diethyl ether. The organic phase was separated and washed 4 times with 250 mL of water and one time with 200 mL of a saturated aqueous NaCl solution in order to remove pyridinium salts. The aqueous phases were combined and re-extracted with 3 times 250 mL of diethyl ether. The final organic phase was dried over $MgSO_4$, filtered and evaporated under vacuum to afford 70.08 g of crude orange oil. At this stage the crude contains residual amount of starting ketone as well as a main impurity corresponding to the condensation (aldolisation+crotonisation) of 2 equivalents of ketone.

The product could be easily purified by dissolving the oil in ethanol (the byproduct and the starting ketone being not soluble in ethanol) followed by a filtration over celite.

The filtrate was evaporated, re-dissolved in $CHCl_3$, filtered again and evaporated to afford 52.57 g of oil with 95% of purity (RMN).

The overall purified yield was 79%.

$^{1}H$ NMR ($CDCl_3$, 400 MHz) δ (ppm): 3.68 (s, 6H), 2.32-2.19 (m, 4H), 1.45-1.39 (m, 4H), 1.30-1.10 (m, 48H), 0.81 (t, J=6.4 Hz, 6H).

$^{13}C$ NMR ($CDCl_3$, 101 MHz) δ (ppm): 166.30, 164.47, 123.65, 52.15, 34.61, 32.15, 30.16, 29.92, 29.91, 29.87, 29.76, 29.60, 28.65, 22.92, 14.34 (terminal $CH_3$).

b) Transesterification with Dimethylaminoethanol to Afford Diamine Mixtures Intermediates:

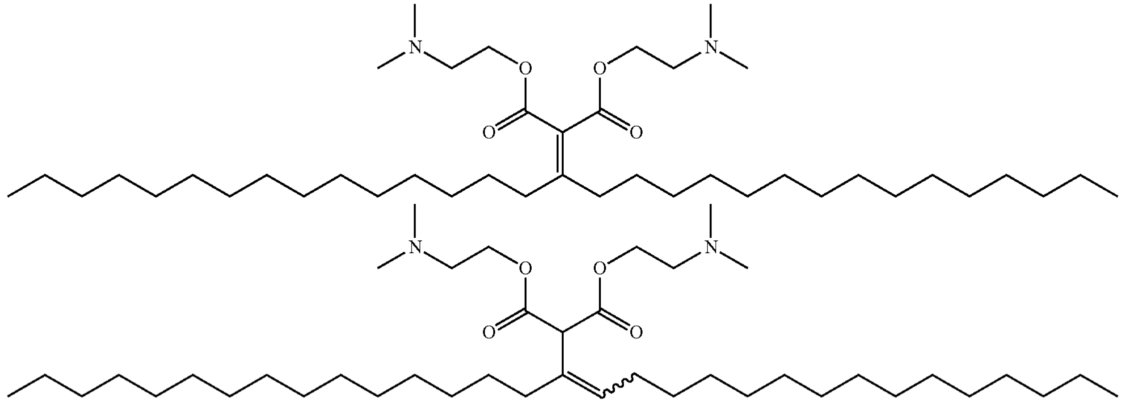

All the reactions were conducted in carefully dried vessels and under an inert argon atmosphere.

Fresh commercial anhydrous toluene and dimethylaminoethanol were used.

In a 2 L double-jacketed reactor equipped with a mechanical stirrer (propeller with four inclined plows), a condenser with a distillation apparatus and a temperature probe were added 42.7 g of the internal ketone/dimethyl malonate adduct (75.6 mmol) followed by 50 mL of toluene. The mixture was stirred at room temperature and 30.4 mL of dimethylaminoethanol (26.9 g, 302.2 mmol, 4 eq.) was added to the reaction system followed by 50 mL of toluene. Then 0.9 g of the catalyst dibutyltin oxide (3.8 mmol, 5 mol %) was added to the reaction mixture followed by 200 mL of toluene.

Then the mixture was allowed to stir at 120° C. and the reaction progress was followed by NMR analysis. To run a proper analysis an aliquot of the reaction medium was sampled and diluted in diethyl ether, quenched with water, decanted and the organic phase was evaporated under vacuum to be analysed in $CDCl_3$ NMR solvent. After 4 days of stirring at 120° C. NMR analysis showed that the conversion level was around 83% with 91% selectivity. In addition, by-product methanol was also present in the distillation flask. The reaction mixture was then allowed to cool down at room temperature and quenched with 500 mL of water. The medium was decanted and the aqueous phase was extracted with three times of 500 mL of diethyl ether. The organic phases were collected and washed three times with 500 mL of water and one time with 500 mL of a saturated aqueous NaCl solution in order to remove excess of dimethylaminoethanol. The organic phase was then dried over $MgSO_4$, filtered and evaporated to give 47.9 g of a crude dark oil. At this stage the crude contained a residual amount of the starting malonate.

The product was then purified by flash chromatography on silica gel with a first eluent consisting of $CHCl_3$/AcOEt mixture going through a gradient from 100% $CHCl_3$ to 100% AcOEt.

In order to remove all the product from the column, the column was also flushed with isopropanol+$NEt_3$ mixture (10% vol $NEt_3$) leading to additional pure product.

The clean fractions were collected affording, after solvent evaporation, 27.8 g of a pure product corresponding to 54% isolated yield.

NMR analysis showed that the product was in the form of a mixture of two position isomers with the following ratio: 54 mol % of the isomerized product (cis and trans diastereoisomers) and 46 mol % of methylenated product.

$^1$H NMR ($CDCl_3$, 400 MHz) δ (ppm): 5.45-5.13 (m, 1H: isomer 2 cis+trans), 4.42 (s, 1H, isomer 2 cis or trans), 4.24-4.06 (m, 4H, isomer 1+2), 3.99 (s, 1H, isomer 2 cis or trans), 2.58-2.40 (m, 4H, isomer 1+2), 2.32-2.24 (m, 4H, isomer 1), 2.20 (s, 12H, isomer 1), 2.19 (s, 12H, isomer 2), 2.09-1.89 (m, 4H, isomer 2 cis+trans), 1.45-0.99 (m, 51H, isomer 1+2), 0.81 (t, J=6.8 Hz, 6H).

$^{13}$C NMR (CDCl3, 101 MHz) δ (ppm): 168.60, 168.41, 165.49, 164.05, 132.07, 131.57, 131.12, 130.77, 123.73, 63.35, 62.76, 58.08, 57.49, 57.45, 53.45, 45.73, 34.45, 30.07, 30.03, 29.72, 29.68, 29.58, 29.53, 29.45, 29.38, 28.46, 28.43, 28.27, 28.09, 22.70, 14.13 (terminal $CH_3$).

c) Methylation to Afford a Mixture of Compounds (VII) and (IX)

All the reactions were conducted in carefully dried vessels and under an inert argon atmosphere.

Fresh commercial anhydrous THF and dimethylsulfate were used as such.

In a 1 L double-jacketed reactor equipped with a mechanical stirrer, a condenser, an addition funnel and a temperature probe were added 100 mL of dry THF and 6.9 mL of dimethylsulfate (9.14 g, 72 mmol, 2 eq.). A solution of 24.6 g of the esteramine (36 mmol, 1 eq.) in 154 mL of THF was preliminary prepared in the addition funnel and was progressively added into the reactor under stirring at room temperature in order to limit the temperature increase. The mixture was then stirred at room temperature under argon and the reaction progress was monitored by NMR analysis. After 2 hours the mixture was brought to 40° C. and 0.2 mL of dimethyl sulfate (2 mmol, 0.06 eq.) were added to allow stirring and to achieve complete conversion.

Reaction was completed after one hour of stirring at 40° C. and all the volatiles (THF and remaining DMS) were removed under vacuum in order to afford 33.15 g of a 95 mol % purity product as a beige wax QA4 with 94% yield. NMR analysis showed the presence of 2 position isomers with 55:45 ratio between isomerized derivative (cis and trans diastereoisomers) and conjugated non-isomerized methylenated derivative.

$^1$H NMR (MeOD, 400 MHz) δ (ppm): 5.60-5.25 (m, 1H: isomer 2 cis+trans), 4.80 (s, 1H, isomer 2 cis or trans), 4.75-4.50 (m, 4H, isomer 1+2), 4.38 (s, 1H, isomer 2 cis or trans), 3.84-3.72 (m, 4H, isomer 1+2), 3.69 (s, 6H, isomer 1+2), 3.22 (s, 18H, isomer 2), 3.21 (s, 18H, isomer 1), 2.50-2.35 (m, 4H, isomer 1), 2.22-2.02 (m, 4H, isomer 2 cis+trans), 1.60-1.09 (m, 35H, isomer 1+2), 0.90 (t, J=6.8 Hz, 6H).

$^{13}$C NMR (MeOD, 101 MHz) δ (ppm): 169.22, 169.01, 168.96, 165.52, 134.16, 133.22, 132.94, 131.74, 65.90, 65.81, 60.23, 60.18, 59.73, 55.27, 54.66, 54.62, 35.66, 35.54, 33.24, 33.23, 31.76, 31.01, 30.94, 30.91, 30.87, 30.85, 30.77, 30.74, 30.71, 30.66, 30.65, 30.63, 30.60, 29.73, 29.62, 29.45, 29.27, 23.89, 14.61 (terminal $CH_3$).

Part 2. C—Additional Mixtures of Monoquaternary Ammonium Compounds of Formula (I) with Diquaternary Ammonium Compounds Eight additional surfactant materials are prepared by mixing various amounts of surfactant materials $QA_1$, $QA_2$, $QA_3$ and $QA_4$.

The weight percentages of monoquaternary ammonium compounds of formula (I) and of diquaternary ammonium compounds contained in surfactant materials $QA_1$, $QA_2$, $QA_3$ and $QA_4$ are compiled here below, the remaining wt. % corresponding to impurities:

TABLE 1

| Surfactant material | Formula(e) of diquaternary ammonium compounds | Approximate wt. % of monoquaternary ammonium compounds | Approximate wt. % of diquaternary ammonium compounds | Mono over diquaternary ammonium compounds ratio, in % |
|---|---|---|---|---|
| $QA_1$ | V | 65.2 | 27.5 | 70 |
| $QA_2$ | V | 85 | 10 | 90 |
| $QA_3$ | V | 0 | 95 | 0 |
| $QA_4$ | VIII and IX | 0 | 94 | 0 |

The following mixtures $QA_5$ to $QA_{12}$ are prepared using convention mixing techniques by mixing $QA_1$ to $QA_4$ in appropriate proportions:

TABLE 2

| Additional surfactant materials | QA1 to QA4 mixtures | Mono- over diquaternary ammonium compounds ratio, in % |
|---|---|---|
| $QA_5$ | $QA^1$ + $QA^2$ | 80 |
| $QA_6$ | $QA_1$ + $QA_3$ | 50 |
| $QA_7$ | $QA_1$ + $QA_3$ | 30 |
| $QA_8$ | $QA_1$ + $QA_3$ | 10 |
| $QA_9$ | $QA_2$ + $QA_4$ | 80 |
| $QA_{10}$ | $QA_2$ + $QA_4$ | 60 |
| $QA_{11}$ | $QA_2$ + $QA_4$ | 40 |
| $QA_{12}$ | $QA_2$ + $QA_4$ | 20 |

Optionally, surfactant materials $QA_1$ to $QA_{12}$ are made available in the form of an aqueous or hydro-alcoholic solution.

Example 3—Fabric Conditioner Compositions

The following compositions are representative of the fabric conditioners described herein:

TABLE 3

| | wt. % Composition | | |
|---|---|---|---|
| Ingredient | Concentrate | Regular | Dilute |
| $QA_1$ | 20 | — | 4 |
| $QA_6$ | — | 9 | — |
| Fatty alcohol | — | — | 0.5 |
| Nonionic surfactant | — | 1.5 | 0.01 |
| Cationic polymer[1] | — | 0.2 | 0.2 |
| Perfume | 2.0 | 0.8 | 0.3 |
| Microcapsule | 2.5 | 0.5 | — |
| Silicone Antifoam | 0.05 | 0.05 | 0.1 |
| Preservative | 0.7 | 0.7 | 0.7 |
| Mirrors, dyes, pH regulators, etc. | <1 wt. % | <1 wt. % | <1 wt. % |
| Water | To 100 | To 100 | To 100 |

Cationic polymer[1] - Flosoft 270LS ex. SNF

The example compositions may be produced using the following method: Pre-melt the fabric softening active at a temperature of ~65° C. Separately heat the water to ~45° C. and add antifoam, preservative and some minors. Slowly add the pre-melt with stirring. Add any remaining ingredients and slowly cool.

The invention claimed is:

1. A fabric conditioner composition comprising:

a. Fabric softening active according to formula (I):

(I)

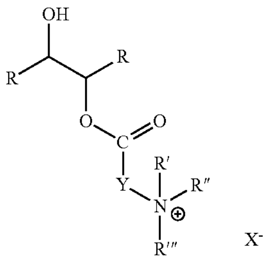

wherein each R, is independently selected from $C_5$-$C_{27}$ aliphatic groups,

Y is a divalent $C_1$-$C_6$ aliphatic group,

R', R" and R", are independently selected from hydrogen or a $C_1$ to $C_4$ alkyl group, and X is an anionic group;

b. 0.1 to 30 wt. % perfume ingredients; and c. Water.

2. The fabric conditioner composition according to claim 1, wherein R is chosen from $C_6$-$C_{17}$ alkyl and $C_6$-$C_{17}$ alkenyl groups.

3. The fabric conditioner composition according to claim 1, wherein R is a $C_{10}$-$C_{17}$ group.

4. The fabric conditioner composition according to claim 1, wherein Y is a methylene group.

5. The fabric conditioner composition according to claim 1, wherein R', R" and R'" are methyl.

6. The fabric conditioner composition according to claim 1, wherein X is a halide anion and the charge is 1.

7. The fabric conditioner composition according to claim 1, wherein the composition additionally comprises fabric softening active according to formula (VI)

(VI)

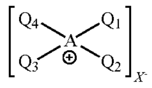

Wherein

A is a tetravalent linker selected from the group consisting of A-1 to A-6

A-1

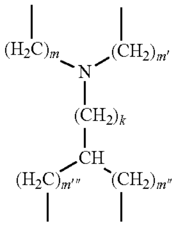

A-2

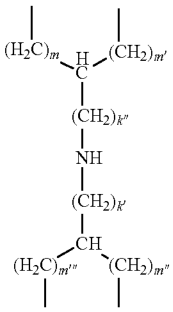

A-3

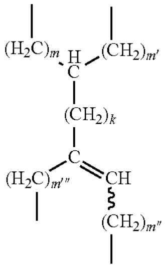

A-4

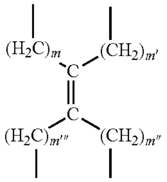

A-5

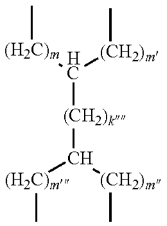

-continued

A-6

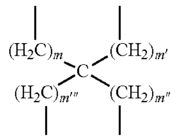

m, m', m'' and m''', are individually selected from 0, 1, 2 or 3, k, k' k'', k''' and k'''', are individually selected from 0, 1, 2 or 3, $Q_1$ to $Q_4$, are individually selected from the group consisting of R and X, R is as defined in claim 1 for the formula (I), X maybe individually selected from groups represented by formula (VII)

(VII)

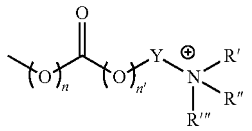

wherein two and only two of $Q_1$ to $Q_4$ are represented by X and two and only two of groups $Q_1$ to $Q_4$ are represented by R, Y is as defined in claim 1 for the compound of formula (I), R', R'' and R''', which may be the same or different at each occurrence, are as defined in claim 1 for the compound of formula (I), and n and n', which may be the same or different at each occurrence, are 0 or 1 with the sum of n+n' being 1 or 2.

8. The fabric conditioner composition according to claim 7, wherein fabric softening active according to formula (VI) comprises fabric softening actives according to formula (V)

(V)

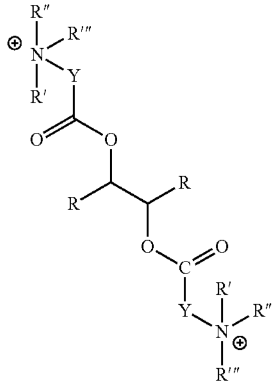

wherein R, may be the same or different and is as defined for the compound of formula (I), Y, may be the same or different and is as defined for the compound of formula (I), and R', R'' and R'', may be the same or different and are as defined in claim 1 for the compound of formula (I).

9. The fabric conditioner composition according to claim 7, wherein the fabric softening active (I) and fabric softening active (VI) are present in a mixture $M_Q$, the amount of fabric softening active (I) in the mixture $M_Q$ is 10 wt. % to 90 wt. % of mixture $M_Q$.

10. The fabric conditioner composition according to claim 1, wherein the compositions comprises 0.5 to 50 wt. % fabric softening active (I) or mixture of fabric softening active (I) and (VI).

11. The fabric conditioner composition according to claim 1, wherein the composition comprises perfume microcapsules.

12. The fabric conditioner composition according to claim 1, wherein the composition further comprises a fatty material.

13. The fabric conditioner composition according to claim 12, wherein the fatty material comprises fatty alcohol.

* * * * *